(12) United States Patent
Rogers

(10) Patent No.: US 12,248,155 B2
(45) Date of Patent: Mar. 11, 2025

(54) WAVEGUIDE COMBINER ASSEMBLIES FOR AUGMENTED REALITY OR VIRTUAL REALITY DISPLAYS

(71) Applicant: Snap Inc., Santa Monica, CA (US)

(72) Inventor: Stephen John Rogers, Didcot (GB)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/729,835

(22) PCT Filed: Jan. 6, 2023

(86) PCT No.: PCT/EP2023/050233
§ 371 (c)(1),
(2) Date: Jul. 17, 2024

(87) PCT Pub. No.: WO2023/138922
PCT Pub. Date: Jul. 27, 2023

(65) Prior Publication Data
US 2025/0013058 A1    Jan. 9, 2025

(30) Foreign Application Priority Data
Jan. 21, 2022  (EP) .................................... 22152685

(51) Int. Cl.
*G02B 27/01*    (2006.01)
(52) U.S. Cl.
CPC .. *G02B 27/0176* (2013.01); *G02B 2027/0154* (2013.01)
(58) Field of Classification Search
CPC .................... G02B 27/0176; G02B 2027/0154
(Continued)

(56) References Cited

U.S. PATENT DOCUMENTS 9,244,281 B1 *  1/2016  Zimmerman .......... G02B 27/01
11,202,043 B1 * 12/2021 Elazhary ............ G02B 27/0176
(Continued)

FOREIGN PATENT DOCUMENTS

CN         118575119        8/2024
WO        2016020643       2/2016
(Continued)

OTHER PUBLICATIONS

"International Application Serial No. PCT/EP2023/050233, International Search Report mailed Mar. 15, 2023", 3 pgs.
(Continued)

*Primary Examiner* — William R Alexander
(74) *Attorney, Agent, or Firm* — Schwegman Lundberg & Woessner, P.A.

(57) ABSTRACT

A waveguide combiner assembly for an augmented reality or virtual reality display. A waveguide combiner has front and rear surfaces substantially parallel to a waveguide plane. A chassis includes a support arm for supporting the waveguide combiner and defining a cavity between front and rear walls of the support arm which are spaced along a first direction by a distance greater than the thickness of the waveguide combiner. A waveguide axis normal to the waveguide plane and the first direction define therebetween a zero or nonzero offset angle. An edge portion of the waveguide combiner extends into the cavity. At least one actively adjustable mounting structure is configured to hold a respective point of the edge portion of the waveguide combiner at a selected position relative to the support arm, thereby enabling adjustment of the offset angle.

20 Claims, 13 Drawing Sheets

(58) Field of Classification Search
USPC .......................................................... 359/630
See application file for complete search history.

(56) References Cited

U.S. PATENT DOCUMENTS

| | | | |
|---|---|---|---|
| 11,604,359 B2 * | 3/2023 | Mills .......................... | G02C 5/22 |
| 11,846,782 B1 * | 12/2023 | Patton ................. | G02B 27/0176 |
| 2017/0307896 A1 | 10/2017 | Kovaluk et al. | |
| 2019/0332142 A1 | 10/2019 | Satou et al. | |
| 2020/0233213 A1 | 7/2020 | Porter et al. | |
| 2020/0278554 A1 | 9/2020 | Schultz et al. | |
| 2020/0341282 A1 * | 10/2020 | Mills ..................... | G02C 5/2272 |
| 2023/0400695 A1 * | 12/2023 | Tremblay ............. | G02B 27/288 |

FOREIGN PATENT DOCUMENTS

| | | |
|---|---|---|
| WO | 2018178626 | 10/2018 |
| WO | 2022049104 | 3/2022 |
| WO | 2023138922 | 7/2023 |

OTHER PUBLICATIONS

"International Application Serial No. PCT/EP2023/050233, Written Opinion mailed Mar. 15, 2023", 6 pgs.

* cited by examiner

WAVEGUIDE COMBINER ASSEMBLIES FOR AUGMENTED REALITY OR VIRTUAL REALITY DISPLAYS

CLAIM OF PRIORITY

This application is a U.S. national-phase application filed under 35 U.S.C. § 371 from International Application Serial No. PCT/EP2023/050233, filed on Jan. 6, 2023, and published as WO 2023/138922 on Jul. 27, 2023, which claims the benefit of priority to European Patent Application Serial No. 22152685.8, filed on Jan. 21, 2022, each of which is incorporated herein by reference in its entirety.

FIELD OF THE INVENTION

The present invention relates to a waveguide combiner assembly for an augmented reality or virtual reality display and methods for adjusting it. In particular, the invention relates to a waveguide combiner assembly that can ease alignment of a waveguide combiner relative to a chassis and the binocular alignment of two waveguide combiners relative to each other, while making those adjustments reversible conversely to current practice.

BACKGROUND OF THE INVENTION

Augmented Reality (AR) displays typically comprise a see-through display screen called a waveguide combiner that combines light from the real world surrounding a user and from a projector coupled to an electronic interface in order to "imprint" virtual graphic information onto their immediate environment and thus enhance their immersive visual experience. This virtual graphic information may be text, symbols, images, videos or drawings of any type To satisfy the general population's desire for portability and comfort, AR displays are to exhibit a form factor akin to that of a conventional pair of glasses by accommodating one or more waveguide combiners as eyepieces and one or more projectors immobilised and embedded within the frame of said glasses as providers of virtual graphic information. Furthermore, optionally encapsulating the one or more waveguide combiners in between correction lenses makes AR accessible to visually impaired people.

The role of a waveguide combiner is to efficiently channel an image-bearing light from an immobilised projector to a user's eye. The waveguide combiner must be thus optically aligned with its respective immobilised projector directly or indirectly via its optical assembly to receive the image-bearing light: this is called monocular alignment. Monocular alignment is usually achieved by carefully spatially arranging the projector, its optical assembly (if any) and the waveguide combiner, such that the boresight (optical axis) of the projected light is incident on a desired point of the input region of the waveguide combiner-usually the centre point.

Additionally, when two waveguide combiners are to be used as a left eyepiece and a right eyepiece of an AR glasses pair, respectively (each waveguide combiner being fed an image-bearing light of a given viewing perspective of a common virtual graphic information by its respective immobilised projector), said waveguide combiners have to be optically aligned relative to one another in order for a stereographic three-dimensional image of the common virtual graphic information to be perceived at a given convergence distance by the user's left and right eyes (which is called binocular alignment). Accordingly, achieving binocular alignment requires the two waveguide combiners to be correctly orientated relative to one another and to the user's eyes.

In practice, binocularly aligning waveguide combiners typically requires the use of an intricate optical jig to position each waveguide combiner within a chassis (on which the waveguide combiners will be supported in use, e.g. part of the glasses frame) relative to each other and to camera eyepieces. The camera eyepieces emulate the user's eyes by collecting the virtual graphic information-bearing light output by each waveguide combiner as pixel-encoded images. Software is then used to assess the binocular alignment of the left and right waveguide combiners by comparing the positions of the pixel-encoded images. A user's brain can accommodate a misalignment of a few pixels horizontally and vertically such that a perfect binocular alignment is not necessary.

As soon as the optimum position of each of the waveguide combiners is reached, each of the waveguide combiner is immobilised relative to the chassis by injecting a small amount of viscous optical-grade glue via some module frame holes. Then, the glue is then cured. Next, the binocular alignment of the as-modified module is checked. If the position of each waveguide combiner is deemed optimum, additional glue is injected via the module frame holes to irreversibly immobilise each waveguide combiner in their optimum position. Then, the additional glue is also cured. If the position of each waveguide combiner is not deemed optimum after the first addition of glue, the glue is removed, each waveguide combiner is re-positioned and is again subjected to the two-step gluing process. The removal of the glue is glue-dependent and usually involves chipping it or cutting it off, which requires a skilled operator so as to not damage the waveguide combiners.

Accordingly, fitting the waveguide combiner into position currently requires an intricate optical alignment jig, two cameras, specialist software and a well-trained and talented human operator, the latter introducing some element of irreproducibility. Above all, the two-step gluing process impedes any subsequent spatial re-adjustments of the waveguide combiners, is time-consuming and relies heavily on the skills of the human operator to manipulate the glue.

There is consequently a need for establishing easier, faster, more cost-effective, more reproducible and reversible systems and methods to optically align waveguide combiners relative to each other and to the user's eyes (binocular alignment).

An object of the present invention is to address these needs.

SUMMARY OF THE INVENTION

According to a first aspect of the invention, there is provided a waveguide combiner assembly for an augmented reality or virtual reality display, comprising:
  a waveguide combiner, having front and rear surfaces which are each substantially parallel to a waveguide plane, the direction normal to the waveguide plane being the waveguide axis, and the distance between the front and rear surfaces along the waveguide axis being the thickness of the waveguide combiner;
  a chassis including a support arm for supporting the waveguide combiner, the support arm defining a cavity between front and rear walls of the support arm which are spaced along a first direction by a distance greater than the thickness of the waveguide combiner, the waveguide axis and the first direction defining an offset angle between them which may be zero or non-zero, an edge portion of the waveguide combiner extending into the cavity; and at least one actively adjustable mounting structure configured to hold a respective point of the edge portion of the waveguide combiner at a selected position relative to the support arm, thereby enabling adjustment of the offset angle.

In this way, the waveguide combiner integrated within the claimed waveguide combiner assembly can be spatially adjusted relative to the support arm of the chassis, thanks to the at least one actively adjustable mounting structure and without the external assistance of an external intricate optical jig and the use of glue to lock the waveguide combiner in position, which significantly eases the process of positioning the waveguide combiner and reduces the associated cost.

The margin of manoeuvre of the waveguide combiner relative to the chassis support arm is defined by the dimensions of the waveguide combiner relative to those of the support arm cavity. The offset angle is the angle between the waveguide axis (which is the axis normal to the apparent major surfaces of the waveguide combiner) and the first direction along which the front and rear walls of the cavity are spaced. The offset angle is zero degrees when the apparent major surfaces of the waveguide combiner are parallel to the front and rear walls of the cavity. The offset angle is different to zero degrees when the apparent major surfaces of the waveguide combiner are not parallel to the front and rear walls of the cavity. The offset angle is thus a measure of how different to the first direction the waveguide axis is and gives an indication on how the waveguide combiner is oriented relative to the front and rear walls of the cavity. In preferred implementations, the offset angle may be adjusted to any value from zero to 2 degrees, more preferably zero to 5 degrees (inclusive).

The at least one actively adjustable mounting structure enables the orientation of the waveguide combiner relative to the chassis to be changed. The orientation can, if necessary, be adjusted any number of times.

In preferred embodiments, the or each actively adjustable mounting structure may comprise:

a clip member, configured to fit onto an edge of the waveguide combiner within the cavity;

front and rear clip extensions, at the front and rear of the clip member respectively, which extend towards the front and rear walls of the support arm and terminate in front and rear clip extension ends, respectively;

an elongate slot in at least one of the front and rear walls of the support arm, the or each elongate slot to receive one of the front and rear clip extension ends therein in order for one of the front and rear walls to hold said end, and being 10 elongate in a second direction which is perpendicular to the first direction; and either or both of:

a first adjustment mechanism configurable to control the position of the clip member relative to the front and rear clip extension ends, whereby the spacing between the respective point of the waveguide combiner and the front and rear walls of the support arm can be adjusted; and/or a second adjustment mechanism configurable to control the position of at least one of the front and rear clip extension ends independently within the or each respective elongate slot along the second direction, whereby the angle of the front and rear surfaces of the waveguide combiner relative to the front and rear walls of the support arm can be adjusted.

Thus, the clip member is affixed on one of the edges of the waveguide combiner i.e. on the thickness of the waveguide combiner at the selected point. Preferably, the front and rear clip extensions are used by both the first and second adjustment mechanisms in a different manner, ensuring independence between the first and second adjustment mechanisms; in other words, actuating one of the first and second adjustment mechanisms preferably does not involve actuating the other one of the first and second adjustment mechanisms.

In preferred embodiments, the first and second clip extensions are aligned with one another along a common axis and may be provided by one and the same component, e.g. a shaft or screw. Where the first adjustment mechanism is provided, the clip member will be moveable relative to the clip extensions, whereas in cases where the first adjustment mechanism is omitted, the clip extensions could optionally be integrally formed with the clip member.

The first adjustment mechanism allows for moving the relevant point of the waveguide combiner (i.e. the respective point at a selected position) forward or backward along the first direction in between the front and rear walls of the support arm. If the position of another point of the waveguide combiner is controlled (e.g. held by another mounting structure), then the movement provided by the first adjustment mechanism gives rise to rotation of the waveguide combiner. This rotation is preferably configured to be about a first rotation axis.

The second adjustment mechanism controls the positions of at least one of the front and rear clip extensions in the second direction. This enables the clip to be tilted within the cavity thereby causing rotation of the waveguide combiner. This rotation is preferably configured to be about a second rotation axis which is perpendicular to the first rotation axis. For example, the first rotation axis may be the yaw axis of the waveguide combiner assembly and the second rotation axis may be the pitch axis of the waveguide combiner assembly.

Accordingly, the preferred waveguide combiner assembly provides at least one and preferably two degrees of rotational freedom to orient the waveguide combiner in a three-dimensional space, which makes it very efficient in to achieve a desired orientation for the waveguide combiner.

In preferred implementations, the first adjustment mechanism may comprise a first threaded shaft forming the front and rear clip extensions, the first threaded shaft passing through a corresponding threaded aperture in the clip member, at least one end of the first threaded shaft being exposed through the respective elongate slot and having coupling means to enable rotation of the first threaded shaft by a user, rotation of the first threaded shaft causing the clip member to move along the first threaded shaft.

Rotating the first threaded shaft passing through the clip member actuates the first adjustment mechanism, which causes said clip member to move forward or backwards between the front and rear walls of the support arm and thus determines its position along the first direction. Stopping this rotation immobilises the clip member securely at a given position. Rotating again the first threaded shaft allows for translating again the clip member along the shaft: there is complete reversibility when it comes to select the position of the clip member (and hence the point of the waveguide combiner to which it is attached) along the first direction in between the front and read walls of the support arm.

Furthermore, rotating the first threaded shaft can be performed by an operator as well as by a robot, which offers the possibility to automate this task, removing an element of irreproducibility.

The second adjustment mechanism preferably comprises a channel in one or both of the front and rear walls of the support arm, the or each channel extending in the second direction and passing through the respective elongate slot, the or each channel containing a biasing element and a stopper element respectively located either side of the respective clip extension, wherein the stopper element is movable along the channel in the second direction and the biasing element biases the respective clip extension towards the stopper element.

In this embodiment, each stopper element controls the position of a clip extension while each biasing element secures said position. The relative positions of the two clip extensions determine the slope of the first threaded shaft and thus the rotation of the waveguide combiner around the second rotation axis. Advantageously, both the front and rear walls of the support arm are provided with such a channel, biasing element and stopper arrangement in order that both ends of the first threaded shaft can have their positions adjusted.

In an alternative embodiment, the second adjustment mechanism may comprise a channel, a biasing element and a stopper element provided in one of the front and rear walls of the support arm whereby one of the clip extension ends is movably supported, and the other of the front and rear walls of the support arm is provided with a socket configured to receive the other of the clip extension ends, wherein preferably the other of the clip extension ends is a ball joint and the socket is a ball socket.

This configuration provides enhanced simplicity, since the or each actively adjustable mounting structure possesses a single biasing element and a single stopper element, the former determining the position of a clip extension and the latter securing said position, both acting on the same clip extension; while the other clip extension is substantially fixed and the slope of the first threaded shaft is dictated by the clip extension whose position is controlled by the stopper element. Consequently, this configuration allows for three-dimensionally orienting the waveguide combiner (when actuating both the first and second adjustment mechanisms) while minimising the number of tasks done by the operator. The operator will have to rotate fewer stopper elements to orient the waveguide combiner. Preferably, the "fixed" clip extension is terminated by a joint ball trapped in a socket located in one of the front and rear walls, although any other way of holding the clip extension in a manner which controls its position while accommodating movement of the other clip extension is acceptable.

In particularly preferred implementations, the stopper element(s) may be grub screw(s) and/or the biasing element(s) may be spring(s).

The stopper element being a grub screw, rotating the latter actuates the second adjustment mechanism, which controls the rotation of the waveguide combiner around the second rotation axis. Stopping the rotation of the stopper element locks the clip extension and thus the waveguide combiner in a given position: immobilising the waveguide combiner is thus reversible (conversely to the case where glue is involved).

Furthermore, rotating the grub screw can be performed by an operator as well as by a robot, which offers the possibility to automate this task, removing an element of irreproducibility.

Preferably, the assembly is configured such that the first adjustment mechanism can adjust a first component of the offset angle defined between the first direction and a projection of the waveguide axis on a first plane, the first plane being perpendicular to front and rear walls and containing the first direction; and the second adjustment mechanism can adjust a second component of the offset angle defined between the second direction and a projection of the waveguide axis on a second plane, the second plane being perpendicular to the first plane and containing the first and second directions.

As mentioned earlier, the first and second adjustment mechanisms allow for rotating the waveguide combiner around a first rotation axis and a second rotation axis, respectively. The first rotation axis is perpendicular to the first plane, while the second rotation axis is perpendicular to the second plane. The first and second adjustment mechanisms control a first component and a second component of the offset angle, respectively.

Most preferably, the first and second adjustment mechanisms are adapted to adjust a yaw and a pitch of the waveguide combiner in the reference frame of the chassis, respectively or vice versa.

What the first and second adjustment mechanisms control is dictated by the position of the chassis support arm relative to the waveguide combiner. If the chassis support arm is horizontally positioned, the first and second adjustment mechanism control the yaw and pitch adjustments, respectively. If the chassis support is vertically positioned, the first and second adjustment mechanism control the pitch and yaw adjustments, respectively.

The waveguide combiner could be attached to the chassis solely by the actively adjustable mounting structure already described. However, it is beneficial to connect the waveguide combiner to the chassis at two or more respective points for more control over the orientation of the waveguide combiner and increased robustness of the assembly. The respective points of the waveguide combiner are preferably spaced apart from one another and may be on the same side of the waveguide combiner as one another or on different sides. It is not essential for each mounting position to be adjustable provided it can accommodate some movement of the waveguide combiner relative to the chassis. Hence in a preferred implementation, the waveguide combiner assembly may comprise an actively adjustable mounting structure and a passively adjustable mounting structure; and wherein the passively adjustable mounting structure is configured to hold a respective point of the edge portion of the diffractive waveguide combiner at a movable position relative to the support arm. For instance, the waveguide combiner assembly may comprise a passive mount configured to fit onto an edge of the waveguide combiner within the cavity, terminated by a pivot connector inserted into the support arm whereby the passively adjustable mounting structure is configured to accommodate changes in the orientation of the waveguide combiner controlled by the actively adjustable mounting structure.

This configuration provides for enhanced simplicity and minimises the number of tasks done by the operator to orient the waveguide combiner as only one of the two mounting points can be adjusted by the operator. The position of the passively adjustable mounting structure is controlled by the actively adjustable mounting structure. This can also ensure more precisely reproducible positioning of the waveguide combiner.

In particularly preferred embodiments, however, the waveguide combiner assembly may comprise two actively adjustable mounting structures. Each of the actively adjustable mounting structures can have any of the features already described.

This configuration allows for achieving a higher control of the orientation of the waveguide combiner as there are two actively adjustable mounting structures, each possessing a first adjustment mechanism and a second adjustment mechanism. Thus, the range of adjustments available may be increased.

It will be appreciated that any number of actively adjustable mounting structures and/or passively adjustable mounting structures may be provided at different respective points on the edge(s) of the waveguide combiner.

Desirably, the clip member of the or each actively adjustable mounting structure is made of a material more compliant (flexible) than the material of the waveguide combiner and that of the chassis. As such, the material of the clip member is able to withstand the distortions caused by adjusting the first and/or second adjustment mechanisms of the or each actively adjustable mounting structure, while reversibly locking the position of the waveguide combiner resulting from adjusting said first and/or second adjustment mechanisms.

The clip member is preferably compliant enough to endure the distortions caused by actuating the first and second adjustment mechanisms so as to keep holding the waveguide combiner and lock it in position. The more compliant material may comprise a polymer, preferably polycarbonate or polypropylene or polysiloxane or any combinations thereof. The polymer of the more compliant material may comprise, for instance, plasticisers to render said polymer softer and more flexible so as to achieve the desired level of compliance of the clip member.

In preferred embodiments, the clip member of the or each actively adjustable mounting structure may be affixed on the thickness of the waveguide combiner by any of: a friction fit; a mechanical joint such as a screw; or an adhesive such as a glue or a pressure-sensitive tape. Any suitable coupling or joining techniques such as these could be employed, reversible or non-reversible.

Preferably, the waveguide combiner may comprise at least one waveguide substrate, the or each waveguide substrate having an input region and an output region able to couple a respective light of a given wavelength range into and out of the or each waveguide substrate, respectively. The waveguide combiner is preferably a diffractive waveguide combiner but could alternatively operate on other mechanisms such as reflection (such implementations are typically referred to as "transflective" waveguide combiners). Examples of diffractive waveguide combiners suitable for use in embodiments of the present invention are disclosed in WO-A-2016/020643, WO-A-2018/178626 and PCT/EP2021/074093, the contents of each being incorporated herein by reference.

According to a second aspect of the invention, there is provided
an augmented reality or virtual reality display, comprising:
at least one waveguide combiner assembly according to the first aspect of the invention; and
at least one projector affixed on the chassis and whose optical assembly is configured to steer an image-bearing light towards the input region of the or each waveguide substrate of the or each waveguide combiner assembly, the or each projector providing a respective image-bearing light; and
wherein the or each waveguide combiner assembly is adapted to convey the respective image-bearing light from the input region to the output region of the or each waveguide substrate, to thereby output the image carried by the respective image bearing light.

It will be appreciated that the optical assembly of the projector may be internal and/or external to the projector.

This configuration allows for three-dimensionally rotating a waveguide combiner within a support arm cavity in a fast, easy, cost-effective and reversible way while the waveguide combiner is still able to in-couple and out-couple the image-bearing light emitted by the projector, in order for the user to experience augmented reality.

The augmented reality or virtual reality display may preferably comprise two waveguide combiner assemblies each in accordance with the first aspect of the invention and two projectors, each associated with a respective waveguide combiner assembly. For instance, the two assemblies may be arranged to position the two waveguide combiners in front of the two eyes of a user wearing the display device. The respective support arms could form part of one and the same chassis, which may take the form of a spectacle frame, a headset or a helmet for instance.

Each waveguide combiner assembly may be adjusted using the disclosed mounting structures such that the respective offset angles of the waveguide combiners achieve binocular alignment.

This configuration allows for orienting two waveguide combiners relative to each other in an easy and reversible way so as to achieve at least partial binocular alignment, a crucial requirement for AR or VR displays whose aim is to make stereographic three-dimensional images accessible to users to make augmented reality even more immersive.

According to a third aspect of the invention, there is provided a method for adjusting two waveguide combiner assemblies, comprising:
1) providing a first waveguide combiner assembly and a second waveguide combiner assemblies each according to the first aspect of the invention;
2) providing a first projector and a second projector affixed on the chassis of the first and second waveguide combiner assemblies, respectively;
3) providing an image-treatment device, a first optical sensor and a second optical sensor, preferentially a first camera and a second camera, the first and second optical sensors being connected to the image-treatment device;
4) actuating the first projector and the second projector to emit a first image-bearing light and a second image-bearing light, respectively, the first and second image-bearing lights embedding a first image and a second image, respectively, such that the first image-bearing light and the second image-bearing light are coupled into the first and second waveguide combiners, respectively, and out from the first and second waveguide combiners towards the first optical sensor and second optical sensor, respectively, whereby the first and second images are received by the first and second optical sensors, respectively;
5) adjusting the at least one actively adjustable mounting structure of the first and/or second waveguide combiner assemblies such that the image-treatment device perceives the first and second images relative to one another on a same plane.

In this way, adjusting the waveguide axis of one or both waveguide combiners allows for positioning the first and second images (each output by a given waveguide combiner, each image being captured by a given camera or other optical sensor and transmitted to the image-treatment device) perceived by the image-treatment device on a same plane relative to one another. The optical sensors and image treatment device can optionally be used to check the relative alignment of the two images before and/or during adjustment of the waveguide combiners' orientation, as well as after such adjustment takes place. The adjustment process may be iterative. The judgement as to whether the relative alignment of the two images is as desired may be performed by appropriately programmed software or by an operator viewing the detected images as perceived by the image-treatment device, e.g. as shown on a monitor or other output device.

Preferably, in step (5) the adjusting achieves at least partial, preferably full, binocular alignment, such that the image-treatment device perceives the first and second images as at least partially, preferably fully, overlapping one another.

Therefore, adjusting the waveguide axis of one or both waveguide combiners allows for controlling the extent of overlap between the first and second images perceived by the image-treatment device and thus dictating the desired degree of binocular alignment i.e. partial or full binocular alignment. A benefit of adjusting two waveguide combiner assemblies to achieve (only) partial binocular alignment is to allow for enlarging the virtual graphic information-related field of view of a user horizontally and/or vertically during later use of the device, when said user wears the augmented reality display made of two waveguide combiner assemblies. The user's virtual graphic information-related field of view obtained via partial binocular alignment is greater than the one obtained via full binocular achievement. This may be desirable in some applications. In other cases, it may be preferably to provide full binocular alignment. This maximises the area across which a user will be able to perceive stereographic three-dimensional images when using the display, which in turn has the potential to make augmented reality more immersive. This can be achieved by arranging for the overlapped portions of said images to display related virtual graphic information exhibiting the same content from different viewing points, in use.

In particularly preferred embodiments, during the adjustment process, at least a first part of the first image and at least a first part of the second image each comprise the same common graphic information and in step (5), the adjusting is such that the image-treatment device perceives the first and second images to be positioned such that the first part of the first image and the first part of the second image overlap and are aligned with one another.

Hence, the overlap between the first and second images perceived by the image-treatment device involves parts (of said images) that are substantially identical to one another. The first part may be less than the whole of the respective image (partial binocular alignment) or could correspond to the whole respective image (full binocular alignment). Having the first and second images displaying common virtual graphic information (i.e. information which is substantially identical in both images) in at least a first part of each image allows for implementing partial or full binocular alignment by having identical parts of said images (perceived by the image-treatment device) coincide with one another, via the adjustment of the waveguide axes of the two waveguide combiners. Advantageously, the common graphical information is selected such that any misalignment between the overlapped parts of the first and second images will be readily apparent. For example, the common graphical information could comprise an image of a cross-hair or other detailed pattern or graphic which will reveal any misalignment between the images.

In the case of partial binocular alignment, the image-treatment device typically perceives a two-dimensional image made of a central portion occupied by the overlap between the first and second images and two peripheral portions accommodating the non-overlapping parts of either the first image or the second images.

In the case of full binocular alignment, the image-treatment device typically perceives a two-dimensional image corresponding to the full overlap between the first and second images obtained by adjusting the waveguide axes of the two waveguide combiners.

Preferably, the first and second waveguide combiners are spaced horizontally from one another; and when the first and second images are partially overlapped, the partial overlap is implemented horizontally and/or vertically;

and when the first and second images are fully overlapped, the full overlap is implemented both horizontally and vertically.

In this way, adjusting the waveguide axis of one or both waveguide combiners may result, during later use of the display in enlarging the virtual graphic information-related field of view of a user horizontally and/or vertically, when said user wears an augmented reality display made of two waveguide combiner assemblies.

Preferably, at least a second part of the first image and at least a second part of the second image each comprise virtual graphic information which is different from the common virtual graphic information and preferably different from one another, and in step (5) the adjusting is such that the image-treatment device perceives the first and second images to be positioned such that the second part of the first image does not overlap the second part of the second image.

In this way, the images used for the adjustment process clearly delineate between the first and second parts of each image so that it can be accurately judged when the desired partial overlap has been achieved by the adjustment. The virtual graphic information in the second part of each image can be of any sort and may be different between the first and second images.

When considering partial binocular alignment, the image-treatment device perceives a two-dimensional image made of a central portion occupied by the overlap between the first and second images and two peripheral portions accommodating the non-overlapping parts of either the first image or the second images.

This method for adjusting two waveguide combiner assemblies allows the manufacture to achieve partial or full binocular alignment in an easy, fast, cost-effective and reversible way which avoids potential damage to the product and possible wastage.

According to a fourth aspect of the invention, there is provided a method of displaying images, comprising:
1) providing an augmented reality or virtual reality display having a first waveguide combiner assembly and a second waveguide combiner assembly, each according to the first aspect of the invention, and both sharing a common chassis;
2) actuating the first projector and the second projector to emit a first image-bearing light and a second image-bearing light, respectively, the first and second image-bearing lights embedding a first image and a second image, respectively, such that the first image-bearing light and the second image-bearing light are coupled into the first and second waveguide combiners, respectively, and out from the first and second waveguide combiners towards a user;
and wherein the waveguide axes of the first waveguide combiner and of the second waveguide combiner are orientated such that the user perceives the first and second images on a same plane as at least partially, preferably fully, overlapping one another, so as to achieve at least partial, preferably full, binocular alignment, respectively.

In this way, prior adjustments of the waveguide axes of two waveguide combiners allows a user to perceive the first and second images on a same plane at least partially, preferably fully overlapping, whereby at least partial, preferably full, binocular alignment is achieved, respectively.

Preferentially, at least a first part of the first image and at least a first part of the second image each comprise the same common virtual graphic information, and the waveguide axes of the first waveguide combiner and of the second waveguide combiner are orientated such that the user perceives the first and second images to be positioned such that the first part of the first image and the first part of the second image overlap and are aligned with one another.

Hence, the overlap between the first and second images perceived by the user involves parts (of said images) that are substantially identical to one another. The part may be less than the whole of the respective image (partial binocular alignment) or could correspond to the whole respective image (full binocular alignment). This results in the user perceiving the common virtual graphic information at an increased brightness (intensity) compared with that which would be achieved without overlap.

In the case of partial binocular alignment obtained by the prior adjustments of the waveguide axes of the two waveguide combiners, if common virtual graphic information is provided in the overlapping parts of the two images, the user perceives a two-dimensional image made of a central portion occupied by the overlap between the first and second images and two peripheral portions accommodating non-overlapping parts of either first image or second image. Accordingly, partial binocular alignment obtained via prior adjustments of the waveguide axis of one or both waveguide combiners, allows for enlarging the virtual graphic information-related field of view of a user horizontally and/or vertically. The user's virtual graphic information-related field of view obtained via partial binocular alignment is greater than the one obtained via full binocular alignment (assuming the size of each image is constant).

In the case of full binocular alignment, if common virtual graphic information is provided in the overlapping parts of the two images, the user perceives a two-dimensional image corresponding to the overlap between the first and second images obtained by prior adjustments of the waveguide axis of one or both waveguide combiners.

In particularly preferred embodiments, at least a first part of the first image and at least a first part of the second image each comprise related virtual graphic information exhibiting the same content from different viewing points, and the waveguide axes of the first waveguide combiner and of the second waveguide combiner are orientated such that the user perceives the first and second images to be positioned such that the first part of the first image and the first part of the second image overlap and are aligned with one another, and appear as a stereographic three-dimensional image.

In this way, the overlap between the first and second images result in the formation of a stereographic three-dimensional image, means to make augmented reality more immersive.

Furthermore, in the case of the partial binocular alignment obtained via prior adjustments of the waveguide axis of one or both waveguide combiners, the user perceives an image made of a stereographic three-dimensional central portion occupied by the overlap between the first and second images, and two-dimensional peripheral portions accommodating non-overlapping parts of either first image or second image. Accordingly, partial binocular alignment obtained via prior adjustments of the waveguide axis of one or both waveguide combiners allow for enlarging the virtual graphic information-related field of view of a user horizontally and/or vertically. The user's virtual graphic information-related field of view obtained via partial binocular alignment is greater than the one obtained via full binocular achievement (assuming the size of each image is constant).

In the case of full binocular alignment obtained via prior adjustments of the waveguide axis of one or both waveguide combiners, if the whole of the first and second images each contain related virtual graphic information exhibiting the same content from different viewing points, the user perceives a fully stereographic three-dimensional image corresponding to substantially the whole field of view.

Preferably, at least a second part of the first image and at least a second part of the second image each comprise virtual graphic information which is different from that in the respective first parts and preferably from one another, and the waveguide axes of the first waveguide combiner and of the second waveguide combiner are configured such that the user perceives the first and second images to be positioned such that the second part of the first image does not overlap the second part of the second image.

In this way, the non-overlapping parts of the field of view may be readily distinguished from the overlapping portion and may be used to display different forms of information from that in the overlapping portion. For example, the non-overlapping parts of each image could be used to display text, number or other data while the overlapping parts could be arranged to display a stereographic image of a person, object or other scene.

The methods of displaying images allow the user to "imprint" either stereographic three-dimensional images or two-dimensional images, or a mixture thereof on their surroundings with the possibility to tune the extent and shape of the user's virtual graphic information-related field of view.

BRIEF DESCRIPTION OF DRAWINGS

Examples of waveguide combiner assemblies in accordance with embodiments of the invention will now be described with reference to the accompanying drawings, in which:

FIG. 3A shows an external view of the waveguide combiner assembly according to the first embodiment of the present invention;

FIG. 3B depicts selected components of the waveguide combiner assembly of FIG. 3A, including an exemplary waveguide combiner on which two mounts are affixed;

FIG. 3C is a version of an enlarged portion of FIG. 3A in which the support arm is shown in transparent form so that the internal components of the assembly are visible;

FIG. 3D is an enlarged portion of FIG. 3C showing one of the actively adjustable mounting structures in greater detail;

FIG. 7A depicts the case where there is no binocular alignment;

FIGS. 7B and 7C show cases where there is partial binocular alignment along two directions or one direction, respectively; and FIG. 7D illustrates the case where there is full binocular alignment.

DETAILED DESCRIPTION

Waveguide combiners can use different methods to optically combine computer generated images with a view of the real world, such as partially reflective surfaces angled to reflect an image that would otherwise be outside of the user's field of view or diffractive optical elements to achieve similar image redirection. Diffractive optical elements could be fabricated from, for example, holographic or lithographic gratings.

Figure 1:
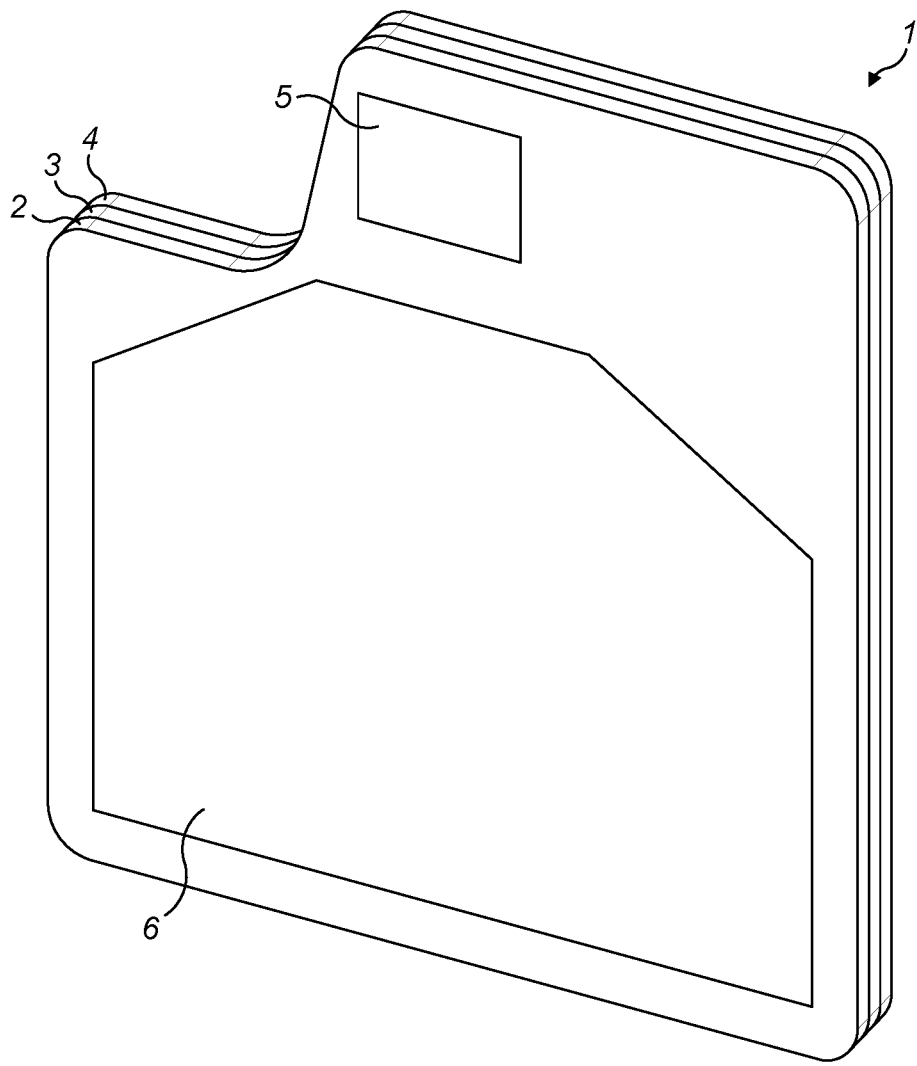
FIG. 1 is a schematic of an exemplary waveguide combiner suitable for use in embodiments of the invention.

For instance, diffractive waveguide combiners can be made of one or more waveguide substrates that are spaced apart and affixed together via double-sided adhesive tape or beads-containing optical-grade glue. In this respect, FIG. 1 depicts a schematic of an exemplary diffractive waveguide combiner 1 which can be used in any of the embodiments described below. In this example, the waveguide combiner 1 is made of three diffractive waveguide substrates 2, 3 and 4 spaced apart and affixed to each other via double-sided adhesive tape or beads-containing optical-grade glue (not shown). However, in other examples the waveguide combiner 1 could comprise a single such waveguide substrate, or a different number of such waveguide substrates. Each waveguide substrate has an input region 5 and an output region 6 being configured to channel light of a given wavelength range emitted initially from a projector (not shown) towards the user's eye. The input and output regions 5, 6 of each waveguide substrate are arranged to spatially coincide with the input and output regions of the other two waveguide substrates, respectively (not shown in FIG. 1 for the sake of clarity).

The input and output regions 5, 6 can be fabricated from, for example, surface relief gratings obtained by imprinting an array of nanometre-sized optical structures on a refractive index-matched resin deposited on a waveguide substrate (and by subsequently UV curing said resin to harden it) or by etching the waveguide substrate using nanolithography methods so as to carve said array of optical structures in any of its apparent major surfaces. Those optical structures can then be buried by adding a layer on top of them, whose refractive index is substantially different to that of the waveguide substrate or resin. These optical structures are designed to diffract light of a given wavelength range and a given angle of incidence in a controlled manner by promoting the diffraction efficiency of given diffraction orders, which allows for splitting and manipulating the image-bearing light through the stack of waveguide substrates.

An input region 5 is used to couple the image-bearing light emitted from a projector into the waveguide substrate, which is then totally internally reflected (provided that the angle of incidence is within the range required for total internal reflection) between its apparent major surfaces, until being coupled out of said waveguide substrate by an output region 6 made of at least one diffractive optical element. Furthermore, an output region 6 can split the image-bearing light into a plurality of similar image-bearing lights of similar brightness (lower than that of the image-bearing light emitted by the projector) overlapping each other. Said plurality of image-bearing lights is then coupled out of the waveguide substrate towards the user's eye so as to form a two-dimensional area larger than the user's eye (called the eyebox), within which the user's eye can perceive the image embedded in the image-bearing light emitted by the projector (irrespective of its location within the eye box). It is thus in the eyebox where the user's eye can visualise the virtual image encoded in the projector light overlaid on the image of the user's surroundings. Alternatively, splitting the image-bearing light can be achieved by an intermediate region located between an input region and an output region.

Further information as to how suitable waveguide combiners 1 may be manufactured, and example configurations suitable for use in the present embodiments, can be found in WO-A-2016/020643, WO-A-2018/178626 and PCT/EP2021/074093.

The projector configured to provide the virtual graphic information can emit a plurality of single colour lights sequentially if the projector comprises a spatial light modulator such as in Liquid Crystal on Silicon (LCoS) or Digital Mirror Device (DMD). Alternatively, the projector can emit a plurality of single colour lights simultaneously if for instance, the projector comprises a two-dimensional array of light emitters such as Light Emitting Diodes (LEDs). The projector can include an optical assembly to steer the light emitted by the projector onto the input region 5 of the proximal waveguide substrate, i.e. the closest waveguide substrate relative to the projector. This optical assembly can include one or more turn prisms depending on the position of the projector relative to the glasses chassis.

Figure 2:
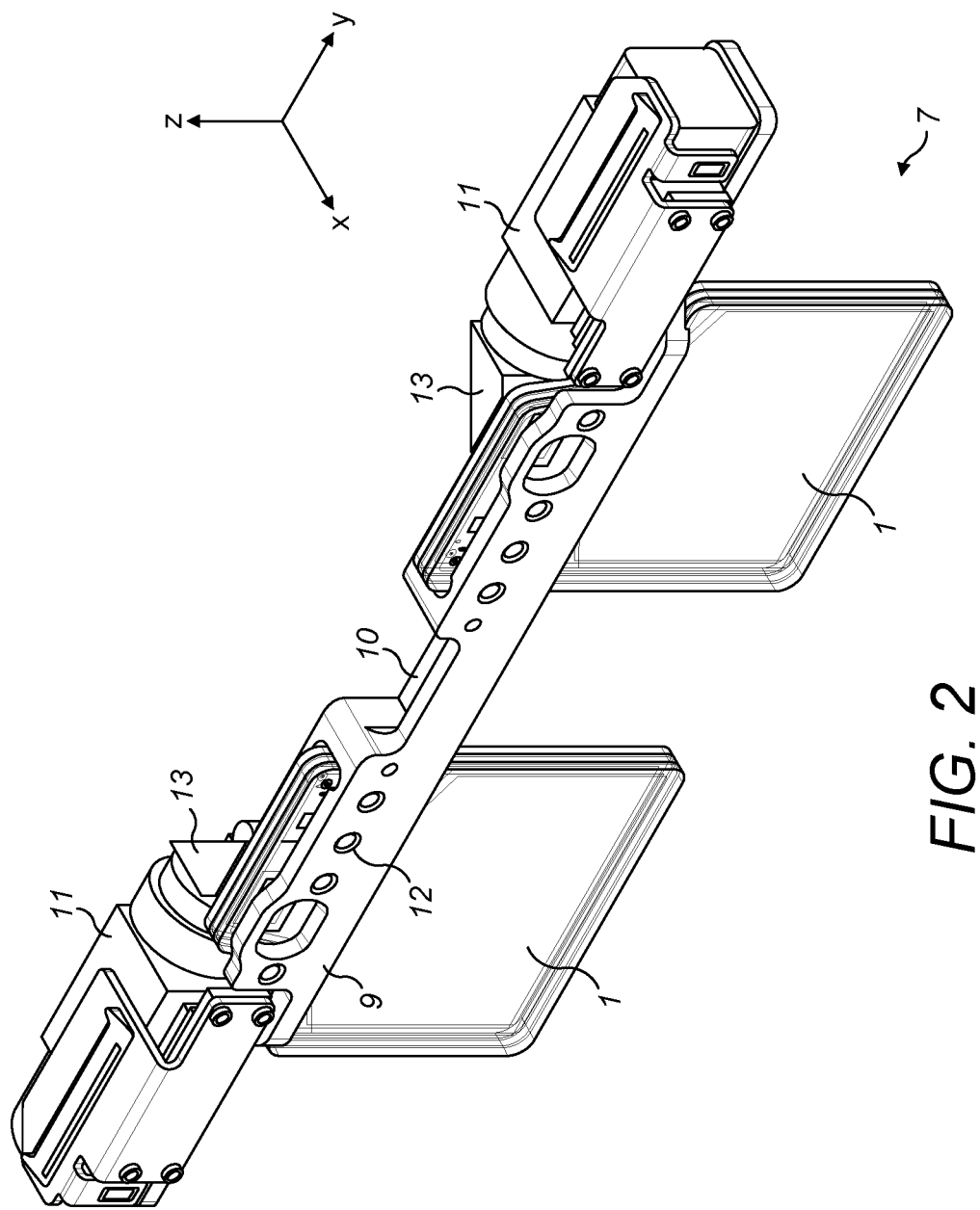
FIG. 2 depicts an AR display according to a comparative example.

As a comparative example, FIG. 2 represents an AR display 7 composed of a pair of diffractive waveguide combiners 1 mounted on a chassis 9 as the left and right eyepieces of display 7, spaced apart by a nose bridge 10 and each receiving light from a respective projector 11. Each diffractive waveguide combiner 1 may be of the same sort described with reference to FIG. 1 above. An upper part of each waveguide combiner 1 extends into a slot of the module chassis 9 to hold it, the walls defining said slot being provided with a plurality of holes 12 leaving some portions of the waveguide combiner upper part exposed. Glue is injected through the holes to fix each waveguide combiner 1 in the required position relative to the chassis 9. The projector 11 associated with a given waveguide combiner 1 is affixed to the module chassis 9 adjacent one of the exposed surfaces of the waveguide combiner 1 (so as to have the projector and the waveguide combiner adopt a "top-injection" configuration), and includes here an optical assembly encompassing a turn prism 13 located close to the input region of the proximal waveguide substrate (i.e. waveguide substrate 4) of the corresponding waveguide combiner 1 so as to steer the collimated image-bearing light (as generated by the projector 11) onto said input region. The projector 11 must indeed be precisely optically aligned (directly or indirectly via its optical assembly) with the input region of each waveguide substrate 2, 3, 4 to efficiently couple a portion of the image-bearing light (emitted by the projector) into each waveguide substrate and thus achieve monocular alignment. Part of the light emitted by the projector 11 that is not diffracted by the input region of the third waveguide substrate 4 (which is proximal to projector 11) is to be diffracted subsequently by the second waveguide substrate 3 or the first waveguide substrate 2. Each portion of the in-coupled image-bearing light is then totally internally reflected within the corresponding waveguide substrate, until being coupled out (e.g. by diffraction) by an output region 6 towards a given eye of the user. During the interaction with the output grating, each portion of the image-bearing light is split so as to form a plurality of similar portions of image-bearing lights, of similar brightness and overlapping each other, that will be subsequently coupled out of a given waveguide substrate towards the user's eye. The projector 11 could be concealed within the module frame temples.

FIGS. 3A to 3D show a first embodiment of the present invention, which aims to enable rotation of a waveguide combiner 1 in three dimensions by adjusting at least one actively adjustable mounting structure. Although the detailed description focuses on diffractive waveguide combiners, the present invention can operate with any kind of waveguide combiners (e.g. diffractive, reflective). In the examples presented, the waveguide combiners 1 used are of the same sort described above with reference to FIG. 1.

Figure 3A:
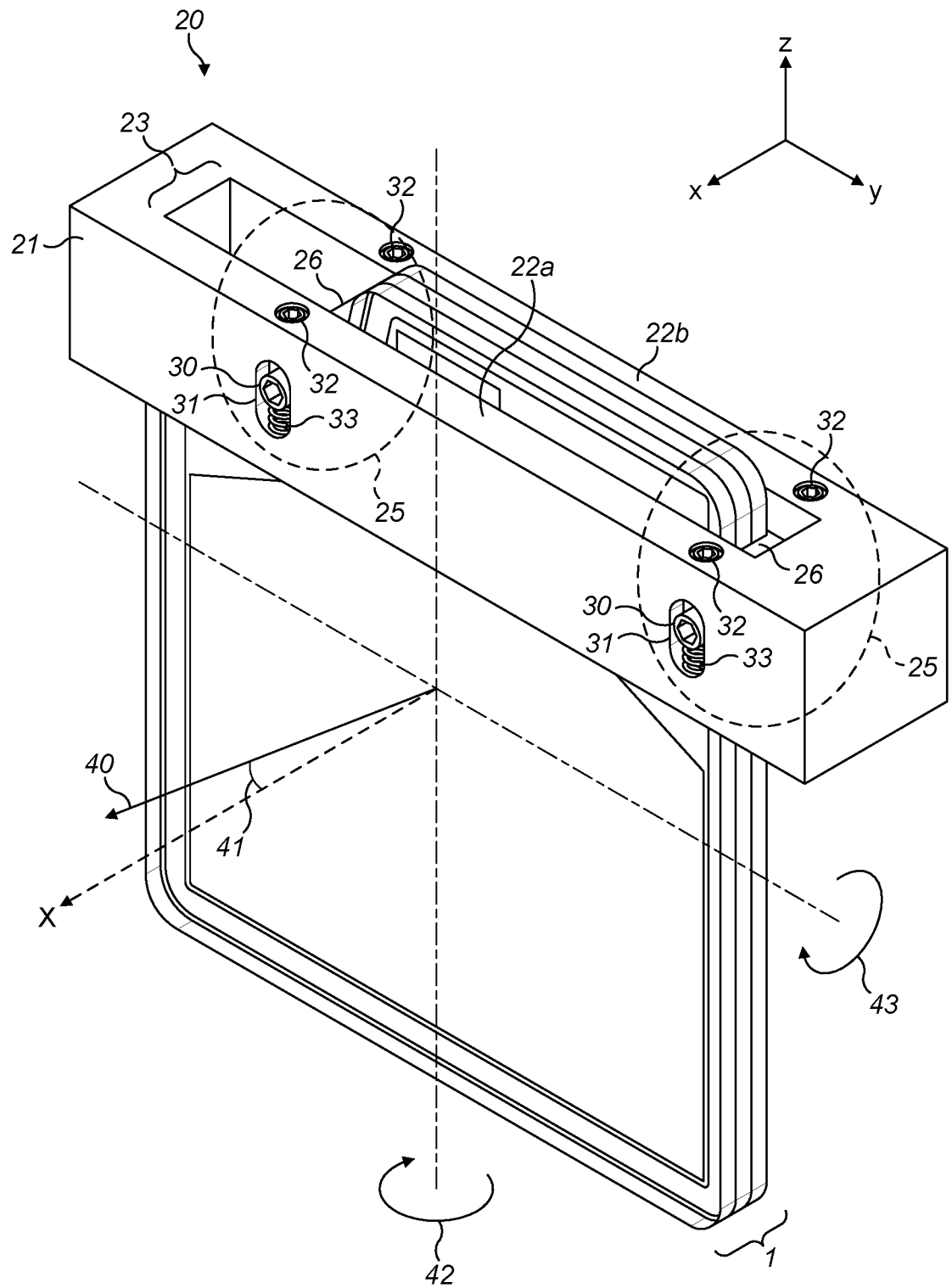
FIGS. 3A, 3B, 3C and 3D illustrate aspects of a waveguide combiner assembly according to a first embodiment of the present invention.

FIG. 3A depicts an external view of the waveguide combiner assembly 20 according to the first embodiment, comprising a waveguide combiner 1 and a support arm 21 forming part of a chassis for supporting the waveguide combiner in use (e.g. a spectacle frame). The waveguide combiner 1 is vertically-oriented and partially extends into an open cavity 23 of the support arm 21 (the support arm 21 being horizontally-oriented in this case), which is defined between front and rear walls 22a, 22b of the support arm 21. The cavity 23 is formed by a spacing between the front and rear walls 22a, 22b in a first direction which here is parallel to the x-axis (the x, y, z-axes shown being in the reference frame of the support arm). The output grating of the waveguide combiner 1 (not shown here) must not be occluded by the chassis, otherwise the image-bearing light might not reach the user's eye.

The waveguide combiner 1 is mounted to the support arm 21 by two actively adjustable mounting structures 25, each arranged to hold a respective point of the waveguide combiner 1 at a desired position relative to the support arm 21, within the cavity 23. In other examples, a single such actively adjustable mounting structure 25 may be provided, alone or in combination with another mounting structure such as a passively adjustable mounting structure (described below). In this embodiment, each actively adjustable mounting structure 25 has the same configuration and so only one will be described in detail.

Figure 3B:
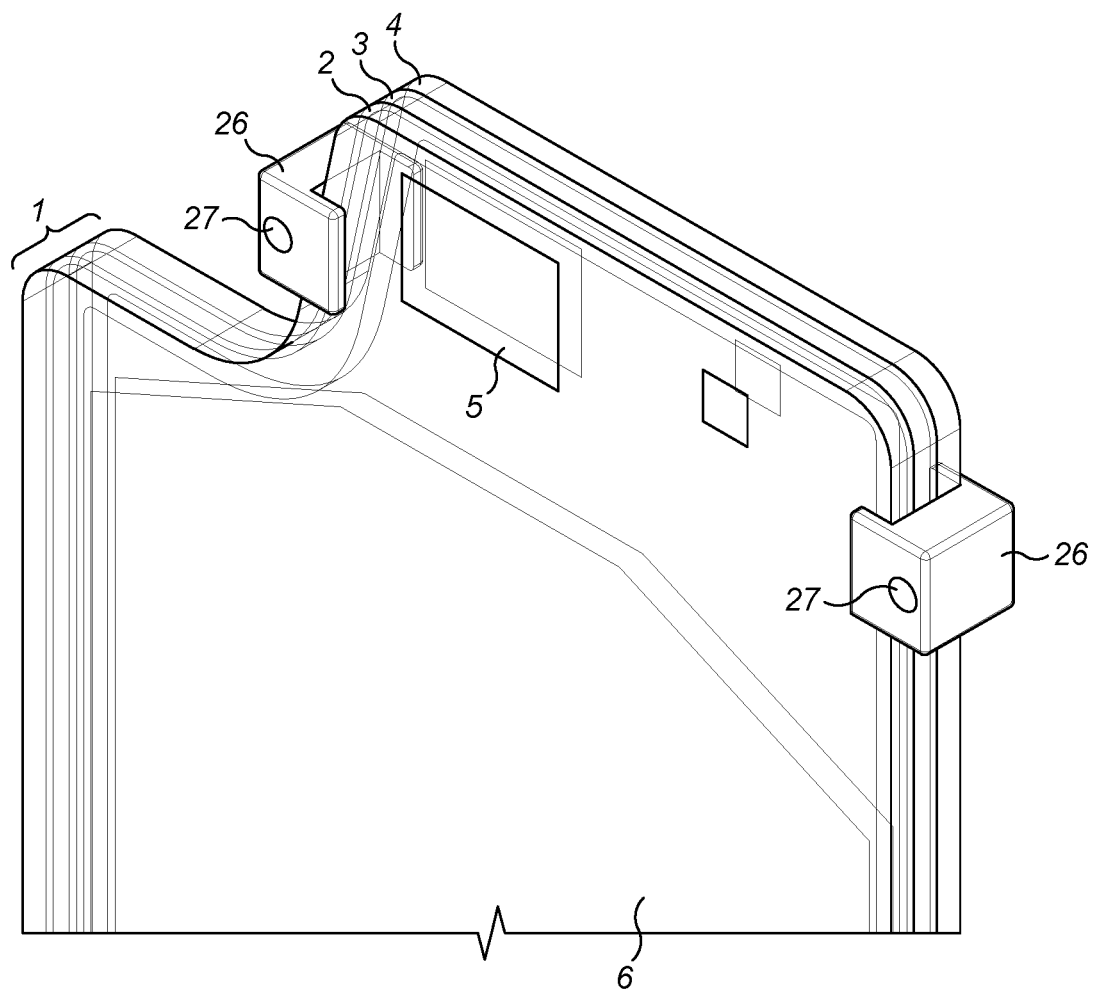

As shown in FIG. 3B, in which the support arm 21 and its components have been removed for clarity, on the diffractive waveguide combiner 1 are placed two mounting clips 26, one forming part of each actively adjustable mounting structure 25. The two mounting clips 26 are affixed across the thickness of the waveguide combiner 1 on opposite edges of the waveguide combiner. Each mounting clip 26 is made of a compliant material, such as a suitable polymer, and grips the waveguide combiner 1 within a recess provided in the clip. In this case, the clips attach to the waveguide combiner via a friction fit, but in other examples they could be affixed using adhesive or via a mechanical join such as a screw fitting. Each mounting clip 26 presents a threaded hole 27 running through it and parallel to the thickness of the waveguide combiner 1. The material constituting the mounting clip 26 may comprise a polymer. This polymer may comprise either polycarbonate or polypropylene or polysiloxane or any combinations thereof. This polymer may comprise plasticisers.

Figure 3C:
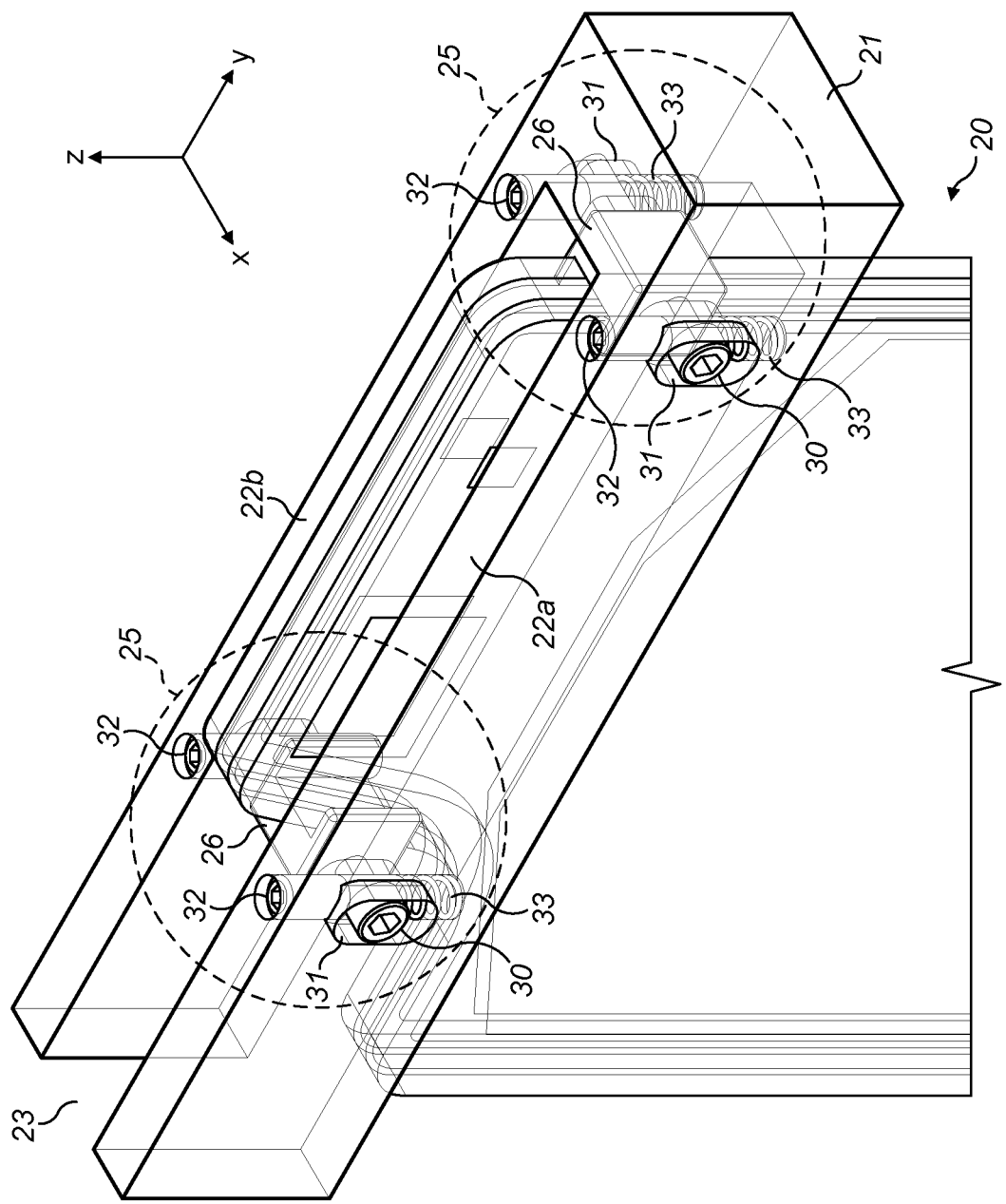
Figure 3D:
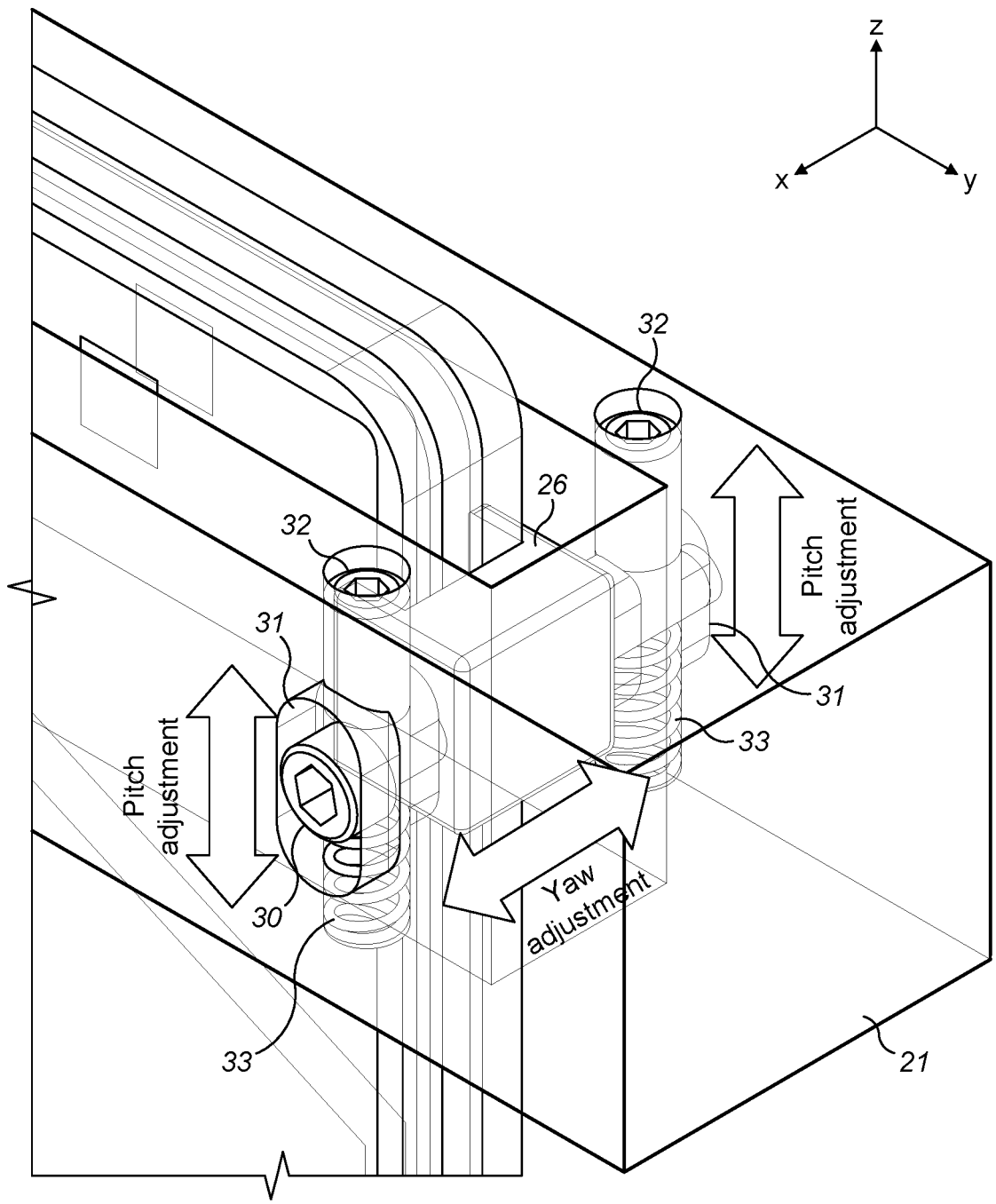

Referring now to FIG. 3C, it will be seen that, once positioned within the cavity 23, the threaded hole 27 of each mounting clip 26 accommodates a threaded shaft (e.g. a screw) 30 whose ends are each located in an elongate slot 31 in the front and rear walls 22a, 22b of the support arm 21. The slots 31 are elongate in a second direction which is perpendicular to the first direction—in this example, the slots 31 extend in the z-axis direction. This provides a first adjustment mechanism of the actively adjustable mounting structure 25. Rotating the screw 30 allows for translating its associated mounting clip 26 along the direction parallel to the length of the screw (which will approximately correspond to the x-axis when the waveguide combiner 1 is vertically-oriented) between the front and rear walls of the cavity 23. The translation of one or both mounting clips 26 can therefore achieve rotation of the waveguide combiner 1 around a first rotation axis 42 which in this case is the yaw axis of the waveguide combiner 1 and will be approximately parallel to the y-axis of the chassis (depending on the precise orientation of the waveguide combiner relative to the chassis). If the initial positions of both mounting clips 26 form a line that is parallel to the line formed by the final positions of both mounting clips, there is no rotation of the waveguide combiner around the first rotation axis 42. If the initial positions of both mounting clips form a line that is not parallel to the line formed by the final positions of both mounting clips, there is rotation around the first rotation axis 42, corresponding to a yaw displacement.

The tilt of each screw 30 is controlled by two grub screw 32/spring 33 pairs located on each side of the mounting clip 26, that act on said screw to control the positions of the ends of the screw within the elongate slots 31 in the second direction. This forms a second adjustment mechanism of the actively adjustable mounting structure 25. More precisely, rotating the grub screws 32 dictates the tilt of each screw 30, while springs 33 tend to secure the screw 30 in position and maintain its tilt. Said tilt is ultimately limited by the longitudinal size of the elongate slots 31. Both screws 30 are adjusted to be substantially parallel to each other so as to allow for the rotation of the waveguide combiner around a second rotation axis 43 which here corresponds to the pitch axis of the waveguide combiner 1. If the final tilt of both screws 30 is substantially equal to the initial tilt of both screws, then there is no rotation of the waveguide combiner around the second rotation axis 43. If the final tilt of both screws 30 is substantially different to the initial tilt of both screws, then there is rotation of the waveguide combiner around the second rotation axis 43, corresponding to a pitch displacement.

The yaw displacement and the pitch displacement are thus reversibly adjustable by independent mechanisms. The adjustments are assisted by the compliance of the mounting clips 26, which are able to sustain distortions when said mechanisms are actuated so as to keep holding the waveguide combiner and lock it in position. By adjusting one or both of the yaw and pitch, the orientation of the waveguide combiner 1 relative to the support arm 21 can be adjusted as necessary. In particular, an offset angle 41 defined between the waveguide axis 40 (normal to the plane of the waveguide combiner 1) and the first direction defined by the support arm (corresponding to the x-axis in the present example) can be adjusted. Preferably, the actively adjustable mounting structure(s) herein provided allow for the offset angle 41 to be varied between at least zero degrees and 2 degrees, more preferably up to 5 degrees. In this way, the relative position of the waveguide combiner relative to the chassis and/or to another waveguide combiner carried by the chassis can be precisely controlled. (Waveguide axis 40, offset angle 41, first rotation axis 42 and second rotation axis 43 are shown on FIG. 3A.)

While it is preferred that the or each actively adjustable mounting structure 25 be provided with both first and second adjustment mechanisms as described above, this is not essential. Hence, in a variant of the first embodiment, each actively adjustable mounting structure 25 could comprise only the first adjustment mechanism (meaning that only the yaw can be adjusted) or only the second adjustment mechanism (such that only the pitch can be adjusted). For example, the elongate slots 31 could be replaced by standard apertures sized to accommodate the ends of screw 30 without any movement available in the second direction, such that only the first adjustment mechanism is present. Alternatively, the screw 30 could be replaced by an unthreaded shaft or extension portions integral with the mount 26 itself, which are supported by the elongate slots 31 such that only the second adjustment mechanism is present.

Figure 4:
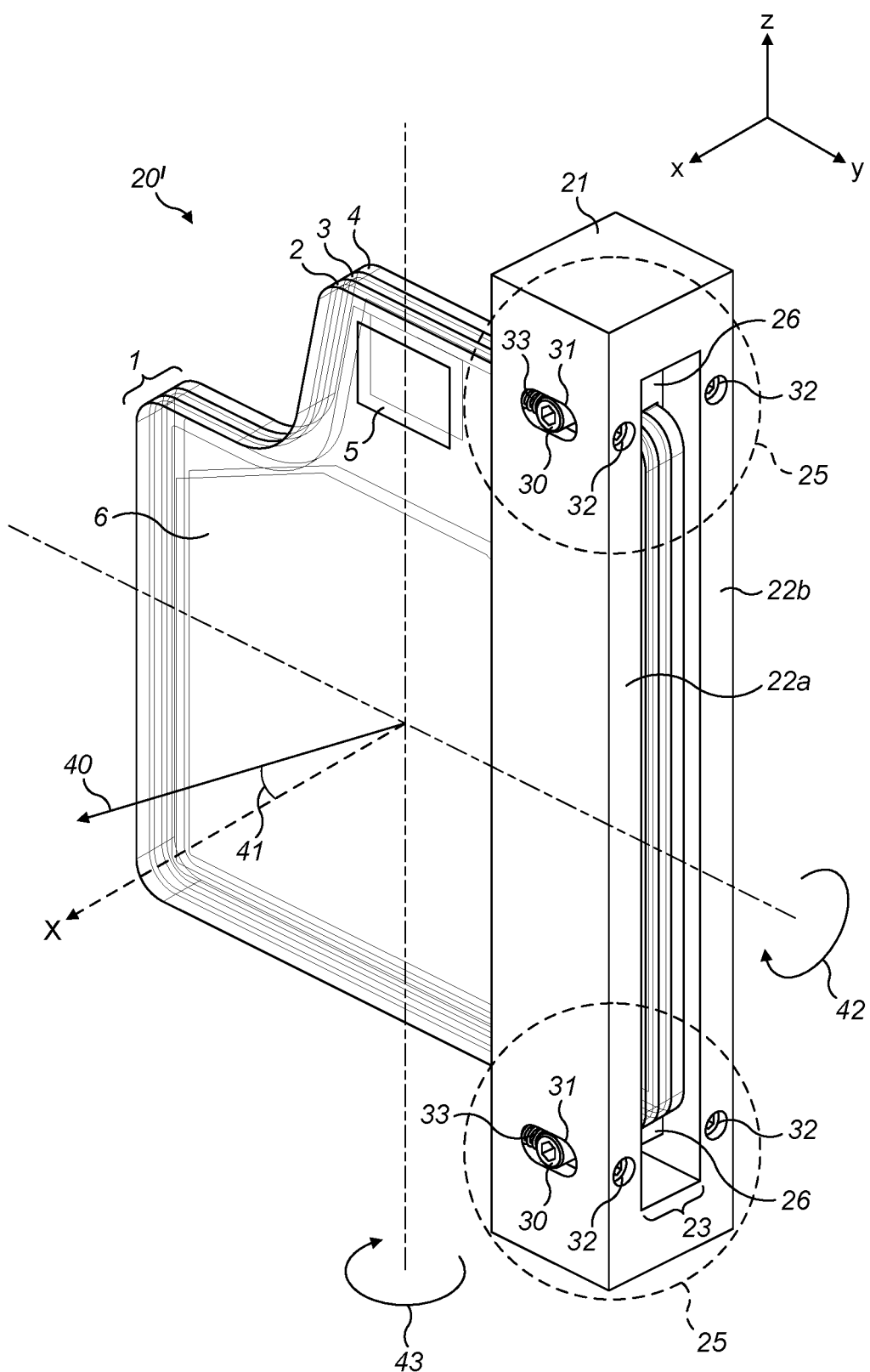
FIG. 4 shows a waveguide combiner assembly according to a second embodiment of the present invention.

FIG. 4 depicts a waveguide combiner assembly 20' according to a second embodiment, wherein the waveguide combiner 1 and the support arm 21 of the chassis are both vertically-oriented. That is, the support arm 21 extends along a side of the waveguide combiner 1 instead of along its top edge. The construction of the waveguide combiner assembly 20' is otherwise the same as that described with reference to the first embodiment, like reference numerals denoting like components. Hence, mounting clips 26 are fitted to respective points on the top and bottom edges of waveguide combiner 1, each forming part of a respective actively adjustable mounting structure of the sort previously described. It will be noted that, here, the second direction along which the elongate slots 31 extend is now parallel to the y-axis.

Due to the alternative orientation of the support arm, the displacement which each of the first and second adjustment mechanisms controls is reversed relative to that in the first embodiment. Hence, the first adjustment mechanism, which is actuated by turning threaded shafts (e.g. screws) 30 still enables rotation about a first rotation axis 42 but this now corresponds to the pitch of the waveguide combiner. Meanwhile, the second adjustment mechanism, which is actuated by turning grub screws 32, enables rotation about second rotation axis 43 which now corresponds to the yaw of the waveguide combiner. As such, the orientation of waveguide axis and the offset angle 41 (defined between the waveguide axis 41 and the first direction of the support arm, here the x-axis) can be adjusted in two axes as previously explained. Again, one or other of the first and second adjustment mechanisms could be omitted if desired.

It will be appreciated that in principle the support arm 21 could take any arbitrary orientation relative to the waveguide combiner 1 (e.g. not parallel to an edge), in which case the rotation axis may not correspond to the yaw and pitch axis. This may be appropriate for non-standard display designs. However, in most practical implementations, control of the yaw and pitch is most preferred.

Figure 5:
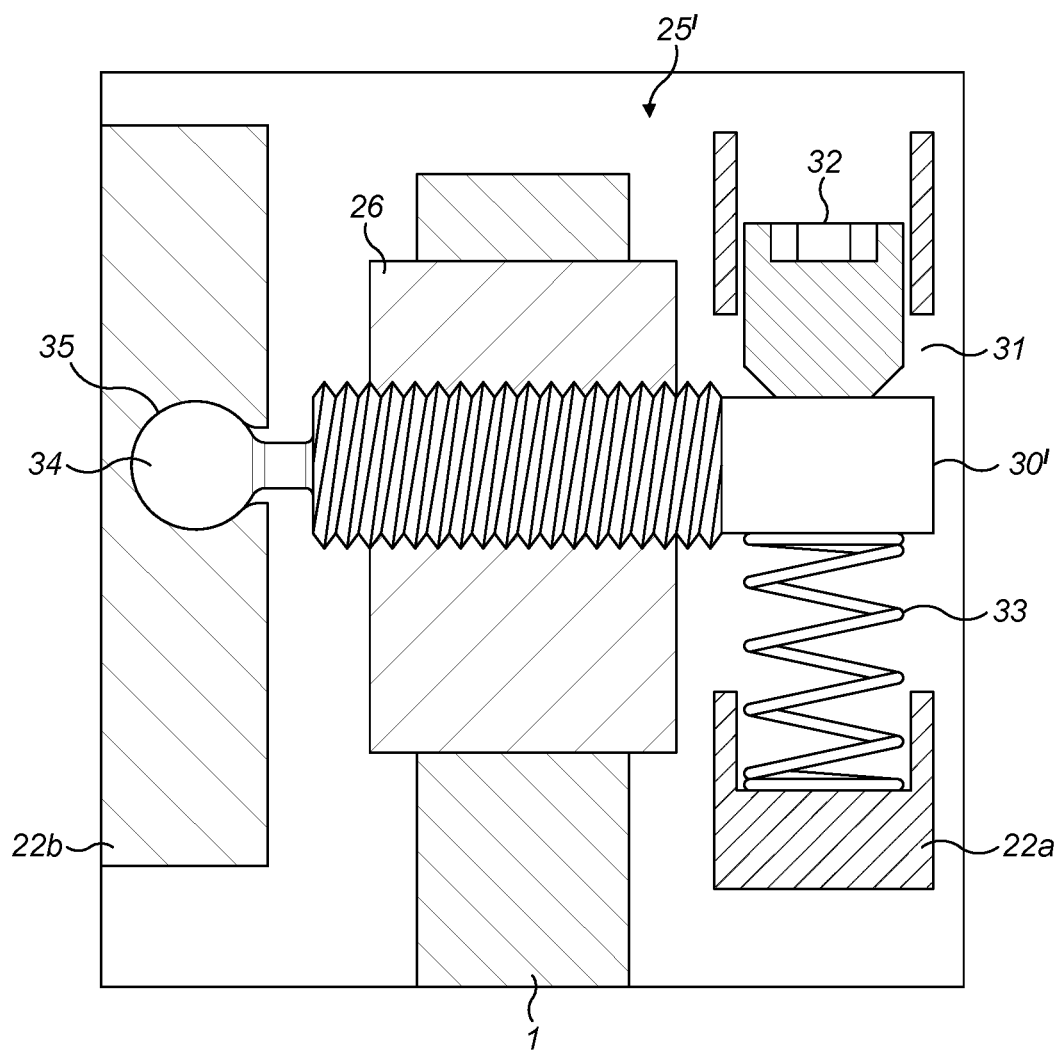
FIG. 5 is a cross-section through another example of an actively adjustable mounting structure which may be used in embodiments of the invention.

FIG. 5 is a cross-section of another example of an actively adjustable mounting structure 25' which may be used in place of those described above in the waveguide combiner assemblies of the first or second embodiment. In this variant, the actively adjustable mounting structure 25' comprises a threaded shaft (e.g. a screw) 30' which as before passes through the mounting clip 26 via a threaded hole (not shown). However in this case, one end of the threaded shaft 30' is terminated by a joint ball 34, which is partially enclosed in a socket 35 located in the rear walls 22b of the support arm 21 of the chassis. The other end of the threaded shaft 30' is supported in an elongate slot 31 in the front wall 22a, provided with a grub screw 32 and spring 33 arrangement as in the previous embodiments. Rotating the screw 30 allows for translating the mounting clip 26 along the length of the screw 30' and so enables the point of the waveguide combiner 1 to which the mounting clip 26 is attached to be moved forwards or backwards between the front and rear walls of the support arm as before. The tilt of screw 30' is controlled by grub screw 32 and secured by spring 33 which enables the exposed end of screw 30' to move along the elongate slot 31 in the second direction. The other end of the screw 30' is somewhat fixed (the joint ball 34 cannot translate along a direction but simply rotates to a certain extent). It will be appreciated that while FIG. 5 shows the fixed end of screw 30' as being located in the rear wall 22b of the support arm and the exposed end in the front wall 22a, this could be reversed.

This type of actively adjustable mounting structure 25' can replace one or both actively adjustable mounting structures 25 depicted in the first or second embodiment so as to enable rotation of a waveguide combiner in three dimensions.

Figure 6:
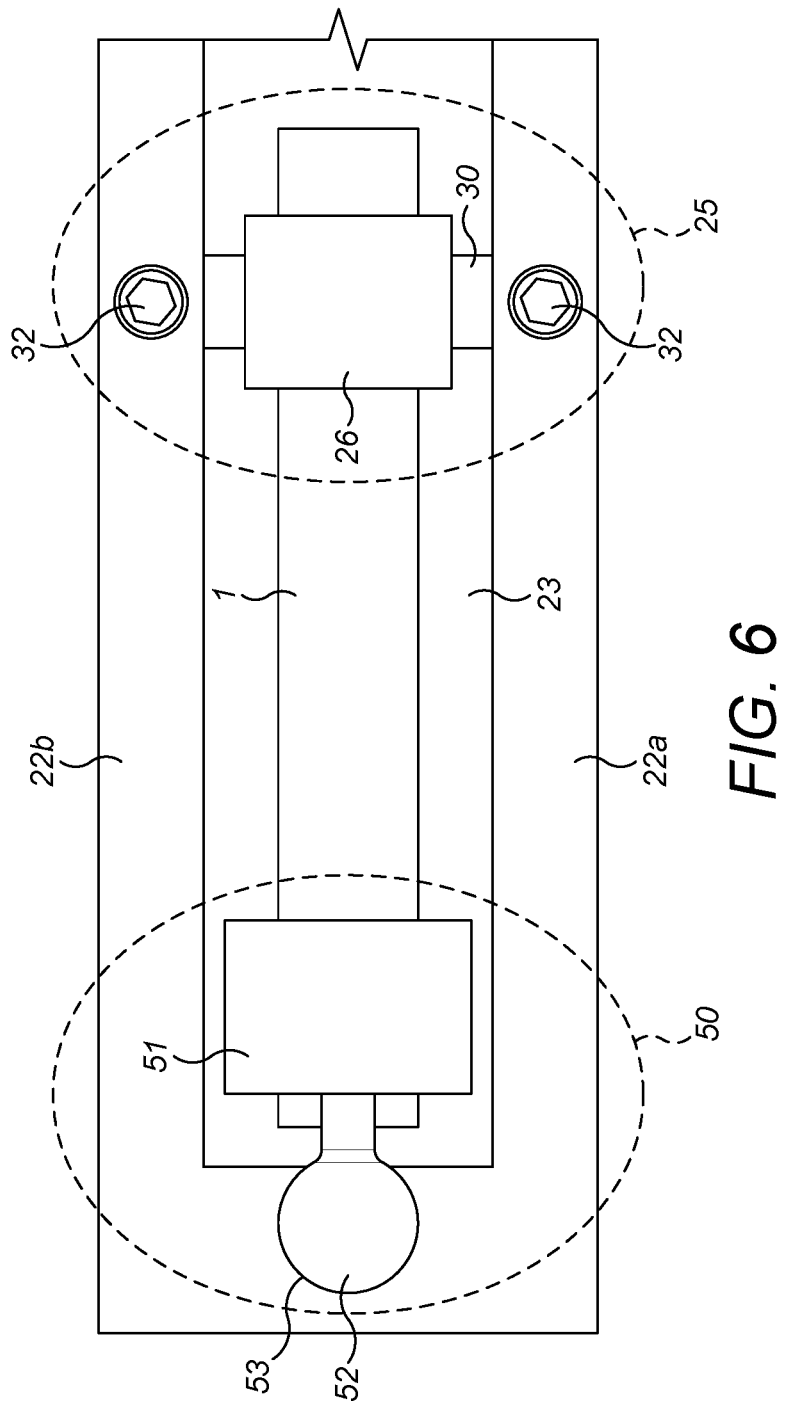
FIG. 6 shows a top view of part of a waveguide combiner assembly according to another embodiment of the present invention.

FIG. 6 is a top view of part of a waveguide combiner according to a further embodiment of the invention. Here, the waveguide combiner assembly is of generally the same construction as that described with reference to the first embodiment, although the mounting clips are affixed to the top edge of the waveguide combiner rather than to opposite side edges. Further, one of the actively adjustable mounting structures 25 is replaced by a passively adjustable mounting structure 50. The passively adjustable mounting structure 50 comprises a mounting clip 51 affixed to a point on the edge of the waveguide combiner 1.

The mounting clip 51 may be of similar design to that of mounting clip 26, having a recess to accommodate the thickness of the waveguide combiner 1. Fixing may be achieved via a friction fit, adhesive or a mechanical joint as before. Again, the mounting clip 51 is preferably formed of a compliant material. The mounting clip 51 comprises an extension terminated by a ball joint 52 which is partially enclosed in a socket 53 located in one of the walls of the cavity 23. In this example the socket 53 is depicted as being provided in an end wall of the cavity (between the front wall 22a and rear wall 22b) but it could alternatively be located in one of the front and rear walls, with the mounting clip redesigned accordingly.

The position of the point on the waveguide combiner 1 to which the passively adjustable mounting structure 50 is attached is thus able to move to an extent, albeit controlled and limited by the mounting clip 51. As such the arrangement is able to accommodate deflections of the waveguide combiner 1 actuated via the actively adjustable mounting structure 25. As in previous embodiments, such adjustments are achieved by rotating the grub screws 32 (that determines the tilt of the screw 30 going through the mounting clip 26) and/or rotating the screw 30 going through the mounting clip 26. This configuration is thus able to rotate the waveguide combiner in three dimensions. It will be appreciated that the actively adjustable mounting structure 25 shown in FIG. 6 could be replaced with an actively adjustable mounting structure 25' of the sort shown in FIG. 5 if desired.

Figure 7A:
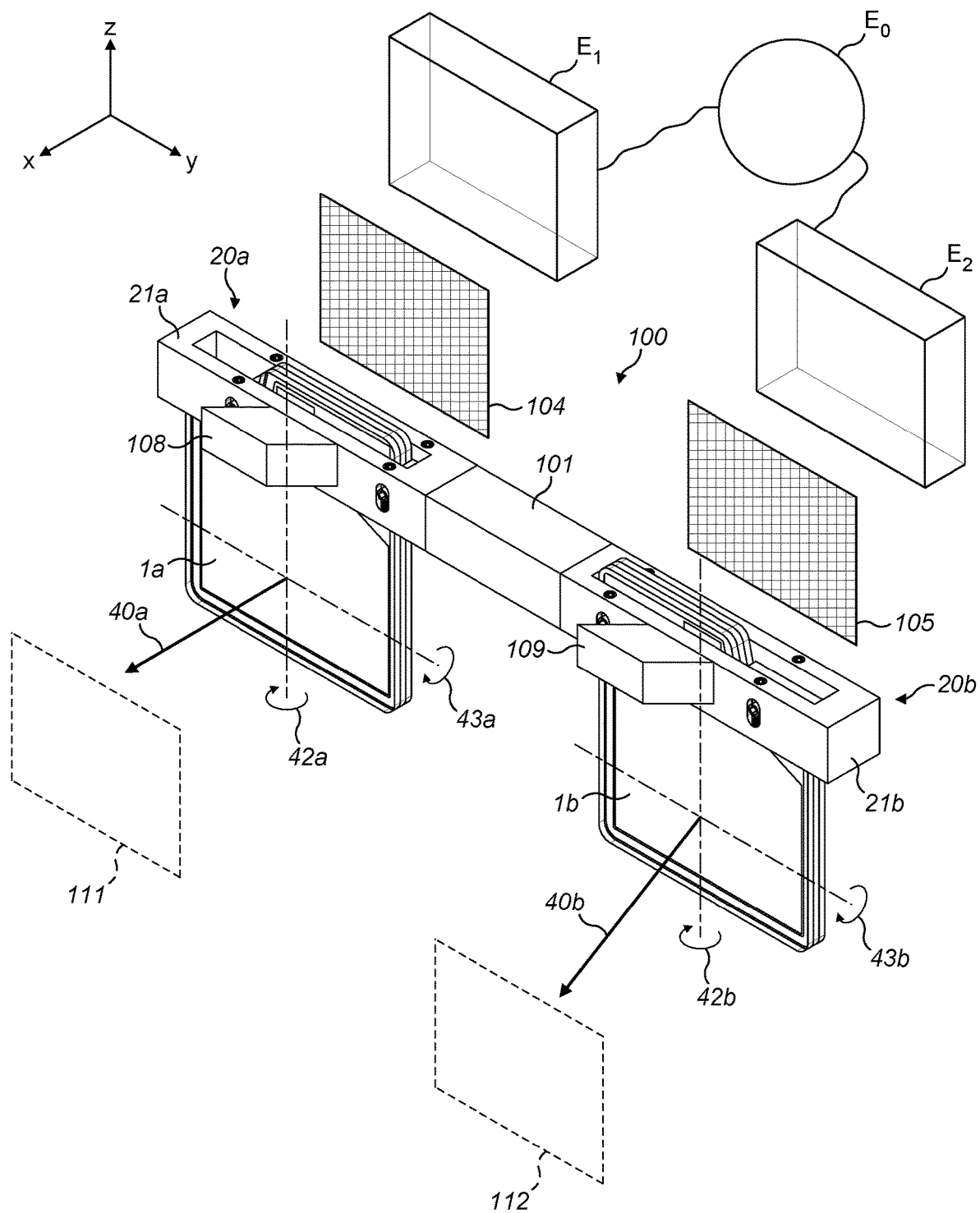
FIGS. 7A, 7B, 7C and 7D show an exemplary display comprising two waveguide combiner assemblies, according to another embodiment of the present invention.

FIG. 7A depicts an embodiment of an AR or VR display 100 and exemplary apparatus for checking the alignment of the waveguide combiners. Here the display 100 comprises two waveguide combiner assemblies 20a, 20b (each in accordance with any of the preceding embodiments) and two projectors 108, 109 emitting an image-bearing light related to the same virtual graphic information from different viewing points. The waveguide combiners 1a, 1b are shown at arbitrary orientations prior to any adjustment taking place. The display includes a chassis 101 into which the respective support arms 21a, 21b are incorporated. The image-bearing light of projector 108 is output from its associated waveguide combiner 1a integrated within waveguide combiner assembly 20a as a first eyebox 104 towards a first optical sensor $E_1$. The image-bearing light of projector 109 is output from its associated waveguide combiner 1b integrated within waveguide combiner assembly 20b as a second eyebox 105 towards a second optical sensor $E_2$. The first and second optical sensors (e.g. cameras) are connected to an image treatment system $E_0$ (such as a computer or other processing device programmed to process image data in such a way as to mimic the human brain) that receives first and second eyeboxes captured by first and second optical sensors, respectively and converts said eyeboxes into a virtual field of view that said image-treatment system perceives.

The image treatment system perceives the first eyebox 104 as a virtual first image 111 located at a first convergence distance from the first optical sensor. The image treatment system perceives the second eyebox 105 as a virtual second image 112 located at a second convergence distance from the second optical sensor. The first and second convergence distances from the first and second optical sensors, respectively are configured to be substantially the same.

In FIG. 7A, the directions of the waveguide axes 40a and 40b are arbitrary (e.g. substantially parallel) and the virtual first and second images 111 and 112 are perceived by the image treatment system as separated from each other: no binocular alignment is achieved. The same result would occur when the directions of the waveguide axes 40a, 40b are divergent from each other and when they are convergent to each other up to a certain degree. In both cases, the image treatment system would still perceive the first and second images as separated, which is generally undesirable.

The orientations of the waveguide combiners 1a, 1b can thus be adjusted using the presently disclosed first and/or second adjustment mechanisms to change the relative positions of the perceived first and second images. The waveguide combiner 1a of the waveguide combiner assembly 20a can be rotated by adjusting its actively adjustable mounting structure, which is reflected by the orientation of waveguide axis 40a. The waveguide combiner 1b of the waveguide combiner assembly 20b can be rotated by adjusting its actively adjustable mounting structure, which is reflected by the orientation of waveguide axis 40b. The directions of both waveguide axes 40a, 40b are preferably arranged to converge such that the image-treatment system $E_0$ the virtual first and second images 111, 112 to at least partially overlap one another, as a combined image 110. As such the device now displays at least partial binocular alignment.

Figure 7B:
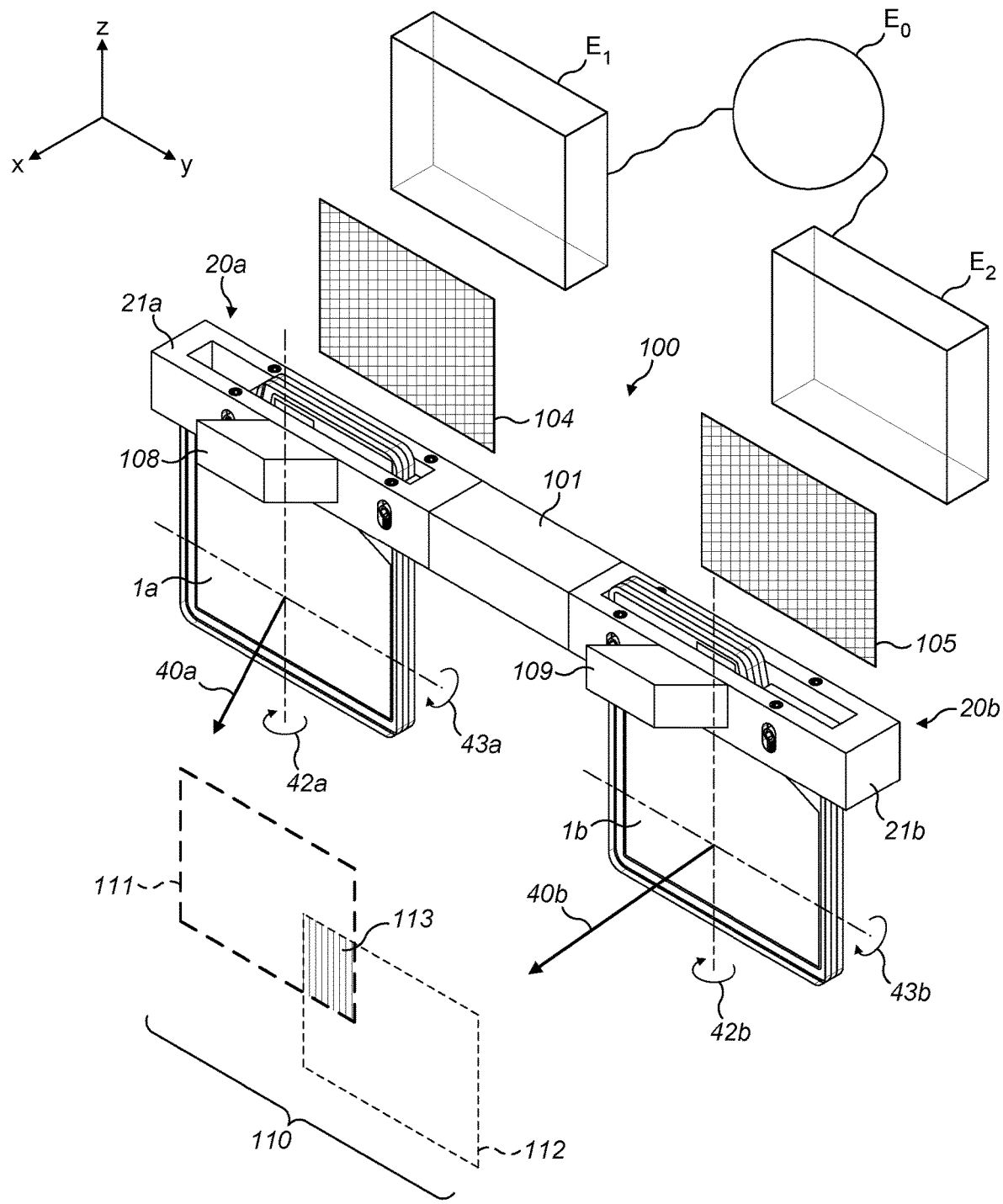

The degree of binocular alignment desired will depend on the end result to be achieved. In some examples, it may be desirable for only part (i.e. not all) of the two images to overlap one another. For instance, FIG. 7B shows the case where the first and second assemblies 20a, 20b have been adjusted such that a corner region of each image overlaps the other across an area 113, while the rest of each image remains non-overlapped. In this case, the two images are offset from one another both horizontally and vertically. In more preferred implementations, the assemblies are adjusted such that the two images are aligned vertically but offset horizontally such that the overlap region extends the full height of the combined image 110 as exemplified in FIG. 7C. In some other implementations (not shown here), the assemblies are adjusted such that the two images are aligned horizontally but offset vertically so as to overlap to a certain degree. The resulting image 110 would correspond to the image 110 of FIG. 7C rotated 90 degrees.

Figure 7C:
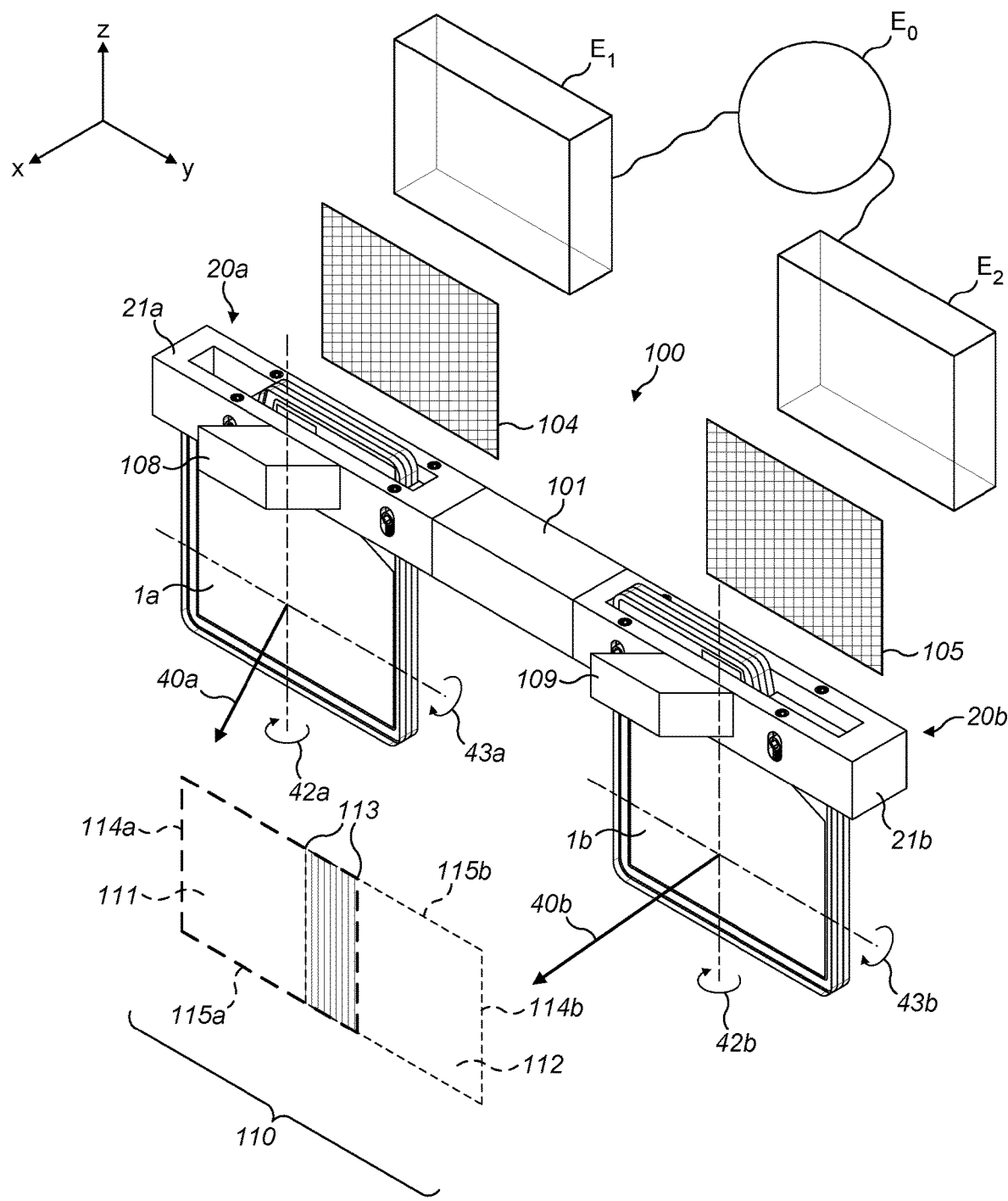
Figure 7D:
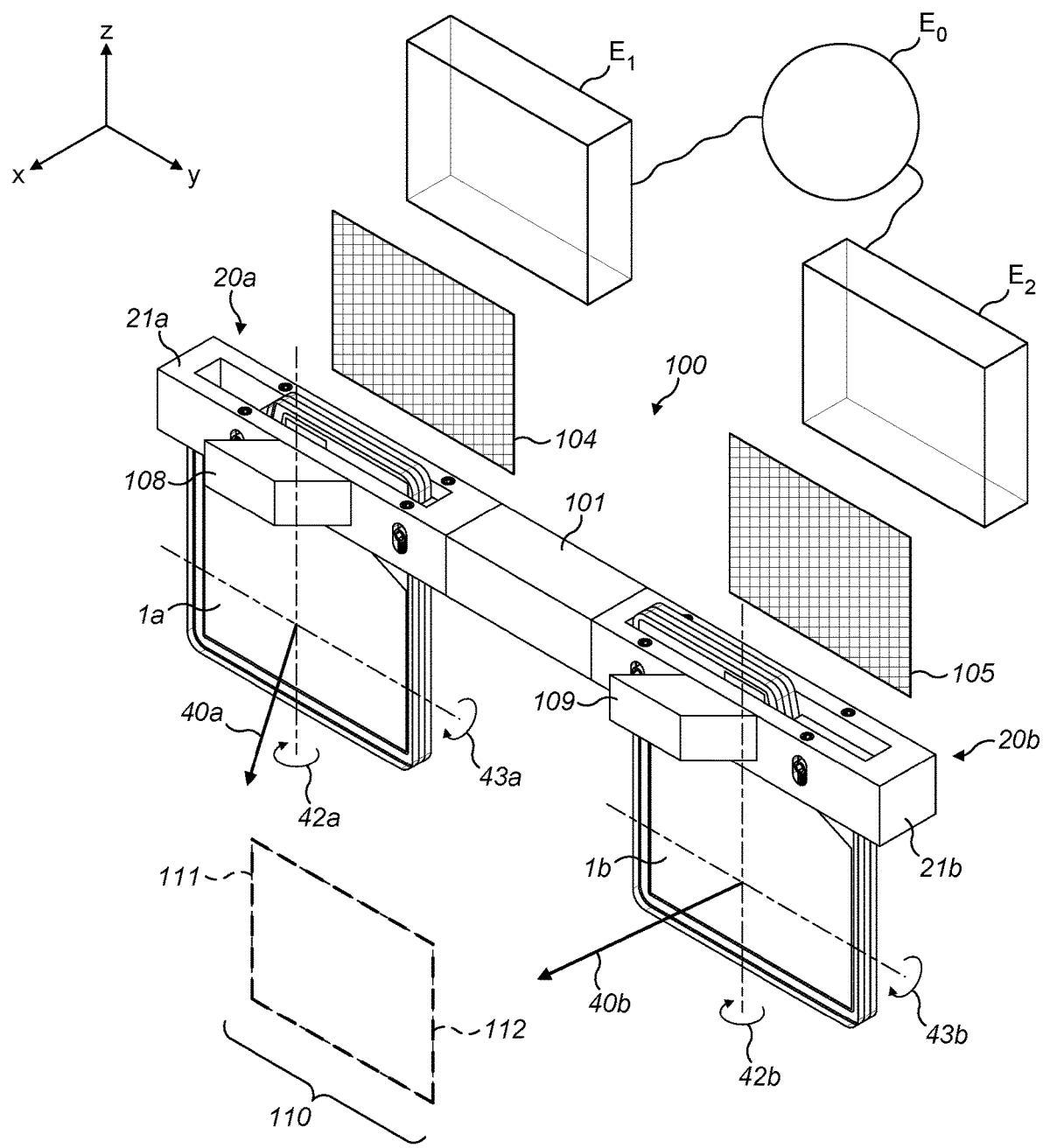

If full binocular alignment is desired, the assemblies 20a, 20b can be adjusted until the image-treatment system $E_0$ perceives the first and second images 111, 112 as fully overlapped and aligned with one another, as shown in FIG. 7D.

During the alignment process, first and second images are typically used in which the parts of the two images which are to overlap contain identical (common) image information, so that their alignment can be judged precisely. This could be checked by a human operator using the image-treatment system $E_0$, or by appropriate software collaborating with the image-treatment system. If less than the whole of each image is to overlap the other, the images 111, 112 used for the alignment process preferably each comprise a first part and a second part. The first part of each image 111, 112 is preferably the same in each of the two images and may contain appropriate markers to ease and check alignment, e.g. an image of crosshairs might be selected. The second part of each image 111, 112 is preferably distinct from the first part so that it is clear which parts are to be overlapped and which are not. Any virtual graphic information could be used in the second part of each image, and preferably this will also be different between the two image 111, 112.

In the final product, the nature of the images projected for visualisation by a user (i.e. when the device is being used to display images) will depend on the desired effect to be achieved. For instance, when the image-bearing lights projected by projectors 108, 109 are identical, virtual first and second images 111, 112 are identical. If the two images are fully overlapped (as in FIG. 7D), the resulting combined image 110 will display same virtual graphic information as those of each of the virtual first and second images but its intensity will be higher than that of virtual first and second images.

When the image-bearing lights projected by projectors 108, 109 represent the same virtual graphic information but from different viewing points (e.g. different views of the same object or scene) and the images are fully overlapped, the combined image 111 will be a stereographic three-dimensional image. Three-dimensional images make AR more immersive for its users.

In other cases, when the image-bearing lights emitted by projectors 108, 109 share a common portion of the virtual graphic information they carry while also displaying each a distinct portion of virtual graphic information and when said common portions of virtual first and second images are overlapped on each other while the distinct portions are not (as in FIG. 7B or 7C), the image-treatment system is able to perceive an enlarged virtual field of view comprising the distinct portions of virtual first and second images and their common portion. Of course, it may be desirable for the overlapping portion to display a stereographic image in which case the image information provided by each image in the overlapping portion may comprise images of the same scene or object from different viewing points. For example, the overlapping part of the combined image may display a stereographic image of an object (e.g. a person) while the non-overlapping part(s) of the combined image may display two-dimensional text or other graphics.

The virtual first and second images may or may not have the same shape as one another, e.g. rectangular or square. Their widths 114a, 114b and lengths 115a, 115b may or may not be substantially the same, respectively. Their widths and lengths are preferably oriented along the z-axis i.e. vertically and the y-axis i.e. horizontally, respectively. In FIGS. 7C and 7D, the overlap 113 of virtual first and second images occurs by aligning their widths and by translating virtual first and second images along the y-axis i.e. horizontally.

The overlap 113 corresponds to the overlap of the common portion (of the virtual graphic information) of virtual first image and the common portion (of the virtual graphic information) of virtual second image. The overlap is located between the distinct portion of virtual first image and the distinct portion of virtual second image. In preferred examples, at least 70% of each of the first and second images may consist of the common virtual graphic information. If the overlap is below 70%, it has been found that the user may experience discomfort and fatigue. However, this percentage is person-dependent. For instance in some cases it may be preferable for at least 90% of each of the first and second images to consist of the common virtual graphic information.

Said common portions are binocularly aligned while said distinct portions are not, which corresponds to a partial binocular alignment.

While the adjustment process has been described using a computer-implemented apparatus, it can also be performed in situ on an end user. In this case, the first and second optical sensors E1, E2 may correspond to a user's right eye and left eye, respectively rather than cameras. The image-treatment system $E_0$ may be a user's brain rather than a computing system.

Nonetheless, binocularly aligning two waveguide combiner assemblies relies preferentially on the use of cameras to improve the rapidity and reproducibility of the process. The camera eyepieces emulate the user's eyes by collecting the virtual graphic information-bearing light output by each waveguide combiner as pixel-encoded images. Software is then used to assess the degree of binocular alignment of the left and right waveguide combiners by comparing the positions of the pixel-encoded images. There is no need here for setting up the AR display on an intricate optical jig to position the left and right waveguide combiners as the waveguide combiner assemblies described throughout the present application allow for rotating their related waveguide combiner in three dimensions.

The user being the final judge of the quality of the desired degree of binocular alignment, they have the possibility to re-adjust themselves the two waveguide combiner assemblies to meet their needs.

Full overlap of virtual first image and virtual second image corresponds to the user's minimum virtual field of view while partial overlap of virtual first image and virtual second image results in a virtual field of view greater than the minimum virtual field of view.

Aspects of the invention are set out in the following clauses:

Clause 1. A waveguide combiner assembly for an augmented reality or virtual reality display, comprising:
- a waveguide combiner, having front and rear surfaces which are each substantially parallel to a waveguide plane, the direction normal to the waveguide plane being the waveguide axis, and the distance between the front and rear surfaces along the waveguide axis being the thickness of the waveguide combiner;
- a chassis including a support arm for supporting the waveguide combiner, the support arm defining a cavity between front and rear walls of the support arm which are spaced along a first direction by a distance greater than the thickness of the waveguide combiner, the waveguide axis and the first direction defining an offset angle between them which may be zero or non-zero, an edge portion of the waveguide combiner extending into the cavity; and
- at least one actively adjustable mounting structure configured to hold a respective point of the edge portion of the waveguide combiner at a selected position relative to the support arm, thereby enabling adjustment of the offset angle.

Clause 2. A waveguide combiner assembly according to clause 1, wherein the or each actively adjustable mounting structure comprises:
- a clip member, configured to fit onto an edge of the waveguide combiner within the cavity;
- front and rear clip extensions, at the front and rear of the clip member respectively, which extend towards the front and rear walls of the support arm and terminate in front and rear clip extension ends, respectively;
- an elongate slot in at least one of the front and rear walls of the support arm, the or each elongate slot to receive one of the front and rear clip extension ends therein in order for one of the front and rear walls to hold said end, and being elongate in a second direction which is perpendicular to the first direction; and either or both of:
- a first adjustment mechanism configurable to control the position of the clip member relative to the front and rear clip extension ends, whereby the spacing between the respective point of the waveguide combiner and the front and rear walls of the support arm can be adjusted; and/or
- a second adjustment mechanism configurable to control the position of at least one of the front and rear clip extension ends independently within the or each respective elongate slot along the second direction, whereby the angle of the front and rear surfaces of the waveguide combiner relative to the front and rear walls of the support arm can be adjusted.

Clause 3. A waveguide combiner assembly according to clause 2, wherein the first adjustment mechanism comprises a first threaded shaft forming the front and rear clip extensions, the first threaded shaft passing through a corresponding threaded aperture in the clip member, at least one end of the first threaded shaft being exposed through the respective elongate slot and having coupling means to enable rotation of the first threaded shaft by a user, rotation of the first threaded shaft causing the clip member to move along the first threaded shaft.

Clause 4. A waveguide combiner assembly according to clause 2 or 3, wherein the second adjustment mechanism comprises a channel in one or both of the front and rear walls of the support arm, the or each channel extending in the second direction and passing through the respective elongate slot, the or each channel containing a biasing element and a stopper element respectively located either side of the respective clip extension, wherein the stopper element is movable along the channel in the second direction and the biasing element biases the respective clip extension towards the stopper element.

Clause 5. A waveguide combiner assembly according to clauses 3 and 4, wherein the second adjustment mechanism comprises a channel, a biasing element and a stopper element provided in one of the front and rear walls of the support arm whereby one of the clip extension ends is movably supported, and the other of the front and rear walls of the support arm is provided with a socket configured to receive the other of the clip extension ends, wherein preferably the other of the clip extension ends is a ball joint and the socket is a ball socket.

Clause 6. A waveguide combiner assembly according to clause 4 or 5, wherein the stopper element(s) are grub screw(s) and/or the biasing element(s) are spring(s).

Clause 7. A waveguide combiner assembly according to any one of clauses 2 to 6, wherein:
the first adjustment mechanism can adjust a first component of the offset angle defined between the first direction and a projection of the waveguide axis on a first plane, the first plane being perpendicular to front and rear walls and containing the first direction;
the second adjustment mechanism can adjust a second component of the offset angle defined between the second direction and a projection of the waveguide axis on a second plane, the second plane being perpendicular to the first plane and containing the first and second directions.

Clause 8. A waveguide combiner assembly according to any one of clauses 2 to 7, wherein the first and second adjustment mechanisms are adapted to adjust a yaw and a pitch of the waveguide combiner in the reference frame of the chassis, respectively, or vice versa.

Clause 9. A waveguide combiner assembly according to any of the preceding clauses, comprising an actively adjustable mounting structure and a passively adjustable mounting structure; and
wherein the passively adjustable mounting structure is configured to hold a respective point of the edge portion of the diffractive waveguide combiner at a movable position relative to the support arm, and comprises a passive mount configured to fit onto an edge of the waveguide combiner within the cavity, and terminated by a pivot connector inserted into the support arm;
whereby the passively adjustable mounting structure is configured to accommodate changes in the orientation of the waveguide combiner controlled by the actively adjustable mounting structure.

Clause 10. A waveguide combiner assembly according to any one of clauses 1 to 9, comprising two actively adjustable mounting structures each as defined in any one of clauses 1 to 9.

Clause 11. A waveguide combiner assembly according to any one of clauses 2 to 10, wherein the clip member of the or each actively adjustable mounting structure is made of a material more compliant than the material of the waveguide combiner and that of the chassis.

Clause 12. A waveguide combiner assembly according to clause 11, wherein the more compliant material comprises a polymer, preferably polycarbonate or polypropylene or polysiloxane or any combinations thereof.

Clause 13. A waveguide combiner assembly according to any of clauses 2 to 12, wherein the clip member of the or each of actively adjustable mounting structure is affixed on the thickness of the waveguide combiner by any of: a friction fit; a mechanical joint such as a screw; or an adhesive such as a glue or a pressure-sensitive tape.

Clause 14. A waveguide combiner assembly according to any of the preceding clauses, wherein the waveguide combiner comprises at least one waveguide substrate, the or each waveguide substrate having an input region and an output region able to couple a respective light of a given wavelength range into and out of the or each waveguide substrate, respectively.

Clause 15. An augmented reality or virtual reality display, comprising:
at least one waveguide combiner assembly according to clause 14; and
at least one projector affixed on the chassis and whose optical assembly is configured to steer an image-bearing light towards the input region of the or each waveguide substrate of the or each waveguide combiner assembly, the or each projector providing a respective image-bearing light; and
wherein the or each waveguide combiner assembly is adapted to convey the respective image-bearing light from the input region to the output region of the or each waveguide substrate, to thereby output the image carried by the respective image-bearing light.

Clause 16. An augmented reality or virtual reality display according to clause 15, comprising two waveguide combiner assemblies and two projectors, each associated with a respective waveguide combiner assembly; and wherein each waveguide combiner assembly is preferably adjusted such that the respective offset angles of the waveguide combiners achieve binocular alignment.

Clause 17. A method for adjusting two waveguide combiner assemblies, comprising:
1) providing a first waveguide combiner assembly and a second waveguide combiner assembly, each according to any of clauses 1 to 14 and sharing a common chassis;
2) providing a first projector and a second projector affixed on the common chassis of the first and second waveguide combiner assemblies, respectively;
3) providing an image-treatment device, a first optical sensor and a second optical sensor, preferentially a first camera and a second camera, the first and second optical sensors being connected to the image-treatment device;
4) actuating the first projector and the second projector to emit a first image-bearing light and a second image-bearing light, respectively, the first and second image-bearing lights embedding a first image and a second image, respectively, such that the first image-bearing light and the second image-bearing light are coupled into the first and second waveguide combiners, respectively, and out from the first and second waveguide combiners towards the first optical sensor and second optical sensor, respectively, whereby the first and second images are received by the first and second optical sensors, respectively;
5) adjusting the at least one actively adjustable mounting structure of the first and/or second waveguide combiner assemblies such that the image-treatment device perceives the first and second images as positioned relative to one another on a same plane.

Clause 18. A method for adjusting two waveguide combiner assemblies according to clause 17, wherein in step (5)

the adjusting achieves at least partial, preferably full, binocular alignment, such that the image-treatment device perceives the first and second images as at least partially, preferably fully, overlapping one another.

Clause 19. A method for adjusting two waveguide combiner assemblies according to clause 18, wherein at least a first part of the first image and at least a first part of the second image each comprise the same common virtual graphic information, and in step (5), the adjusting is such that the image-treatment device perceives the first and second images to be positioned such that the first part of the first image and the first part of the second image overlap and are aligned with one another.

Clause 20. A method for adjusting two waveguide combiner assemblies according to clause 18 or clause 19, wherein the first and second waveguide combiners are spaced horizontally from one another; and
 wherein when the first and second images are partially overlapped, the partial overlap is implemented horizontally and/or vertically;
 and when the first and second images are fully overlapped, the full overlap is implemented both horizontally and vertically.

Clause 21. A method for adjusting two waveguide combiner assemblies according to clause 19 or clause 20, wherein at least a second part of the first image and at least a second part of the second image each comprise virtual graphic information which is different from the common virtual graphic information and preferably different from one another, and in step (5) the adjusting is such that the image-treatment device perceives the first and second images to be positioned such that the second part of the first image does not overlap the second part of the second image.

Clause 22. A method of displaying images, comprising:
 1) providing an augmented reality or virtual reality display having a first waveguide combiner assembly and a second waveguide combiner assembly, each according to any of clauses 1 to 14, and both sharing a common chassis;
 2) actuating the first projector and the second projector to emit a first image-bearing light and a second image-bearing light, respectively, the first and second image-bearing lights embedding a first image and a second image, respectively, such that the first image-bearing light and the second image-bearing light are coupled into the first and second waveguide combiners, respectively, and out from the first and second waveguide combiners towards a user;
and wherein the waveguide axes of the first waveguide combiner and of the second waveguide combiner are orientated such that the user perceives the first and second images on a same plane as at least partially, preferably fully, overlapping one another, whereby at least partial, preferably full, binocular alignment is achieved, respectively.

Clause 23. A method of displaying images according to clause 22, wherein at least a first part of the first image and at least a first part of the second image each comprise the same common virtual graphic information, and the waveguide axes of the first waveguide combiner and of the second waveguide combiner are orientated such that the user perceives the first and second images to be positioned such that the first part of the first image and the first part of the second image overlap and are aligned with one another.

Clause 24. A method of displaying images according to clause 22, wherein at least a first part of the first image and at least a first part of the second image each comprise related virtual graphic information exhibiting the same content from different viewing points, and the waveguide axes of the first waveguide combiner and of the second waveguide combiner are orientated such that the user perceives the first and second images to be positioned such that the first part of the first image and the first part of the second image overlap and are aligned with one another, and appear as a stereographic three-dimensional image.

Clause 25. A method of displaying images according to any one of clauses 23 and 24, wherein at least a second part of the first image and at least a second part of the second image each comprise virtual graphic information which is different from that in the respective first parts and preferably from one another, and the waveguide axes of the first waveguide combiner and of the second waveguide combiner are orientated such that the user perceives the first and second images to be positioned such that the second part of the first image does not overlap the second part of the second image.

The invention claimed is:

1. A waveguide combiner assembly for an augmented reality or virtual reality display, comprising:
 a waveguide combiner, having front and rear surfaces which are each substantially parallel to a waveguide plane, a direction normal to the waveguide plane being a waveguide axis, a distance between the front and rear surfaces along the waveguide axis being a thickness of the waveguide combiner;
 a chassis including a support arm for supporting the waveguide combiner, the support arm defining a cavity between front and rear walls of the support arm which are spaced along a first direction by a distance greater than the thickness of the waveguide combiner, the waveguide axis and the first direction defining an offset angle between them which may be zero or non-zero, an edge portion of the waveguide combiner extending into the cavity; and
 at least one actively adjustable mounting structure configured to hold a respective point of the edge portion of the waveguide combiner at a selected position relative to the support arm, thereby enabling adjustment of the offset angle.

2. The waveguide combiner assembly according to claim 1, wherein the at least one actively adjustable mounting structure comprises:
 a clip member, configured to fit onto an edge of the waveguide combiner within the cavity;
 front and rear clip extensions, at the front and rear of the clip member respectively, which extend towards the front and rear walls of the support arm, respectively, and terminate in front and rear clip extension ends, respectively;
 an elongate slot in one or both of the front and rear walls of the support arm, the elongate slot to receive one of the front and rear clip extension ends therein in order for one of the front and rear walls to hold said end, and being elongate in a second direction which is perpendicular to the first direction; and at least one of:
 a first adjustment mechanism configurable to control the position of the clip member relative to the front and rear clip extension ends, whereby the spacing between the respective point of the waveguide combiner and the front and rear walls of the support arm can be adjusted; and/or
 a second adjustment mechanism configurable to control the position of at least one of the front and rear clip extension ends independently within the respective elongate slot along the second direction, whereby the angle of the front and rear surfaces of the waveguide combiner relative to the front and rear walls of the support arm can be adjusted.

3. The waveguide combiner assembly according to claim 2, wherein the first adjustment mechanism comprises a first threaded shaft forming the front and rear clip extensions, the first threaded shaft passing through a corresponding threaded aperture in the clip member, at least one end of the first threaded shaft being exposed through the respective elongate slot and having coupling means to enable rotation of the first threaded shaft by a user, rotation of the first threaded shaft causing the clip member to move along the first threaded shaft.

4. The waveguide combiner assembly according to claim 2, wherein the second adjustment mechanism comprises a channel in one or both of the front and rear walls of the support arm, the channel extending in the second direction and passing through the respective elongate slot, the channel containing a biasing element and a stopper element respectively located on opposite sides of the respective clip extension, wherein the stopper element is movable along the channel in the second direction and the biasing element biases the respective clip extension towards the stopper element.

5. The waveguide combiner assembly according to claim 2, wherein:
the first adjustment mechanism can adjust a first component of the offset angle defined between the first direction and a projection of the waveguide axis on a first plane, the first plane being perpendicular to front and rear walls and containing the first direction; and
the second adjustment mechanism can adjust a second component of the offset angle defined between the second direction and a projection of the waveguide axis on a second plane, the second plane being perpendicular to the first plane and containing the first and second directions.

6. The waveguide combiner assembly according to claim 2, wherein the first and second adjustment mechanisms are adapted to adjust a yaw and a pitch of the waveguide combiner in a reference frame of the chassis, respectively, or vice versa.

7. The waveguide combiner assembly according to claim 1, comprising an actively adjustable mounting structure and a passively adjustable mounting structure;
wherein the passively adjustable mounting structure is configured to hold a respective point of the edge portion of the waveguide combiner at a movable position relative to the support arm, and comprises a passive mount configured to fit onto an edge of the waveguide combiner within the cavity, and terminated by a pivot connector inserted into the support arm; and
whereby the passively adjustable mounting structure is configured to accommodate changes in orientation of the waveguide combiner controlled by the actively adjustable mounting structure.

8. The waveguide combiner assembly according to claim 1, comprising two actively adjustable mounting structures each as defined in claim 1.

9. The waveguide combiner assembly according to claim 2, wherein the clip member of the actively adjustable mounting structure is made of a material more compliant than the material of the waveguide combiner and that of the chassis.

10. The waveguide combiner assembly according to claim 1, wherein the waveguide combiner comprises at least one waveguide substrate, the at least one waveguide substrate having an input region and an output region able to couple a respective light of a given wavelength range into and out of the or each at least one waveguide substrate, respectively.

11. The waveguide combiner assembly according to claim 10, further comprising:
a projector affixed on the chassis comprising an optical assembly configured to steer an image-bearing light towards the input region of the waveguide substrate of the waveguide combiner assembly, the projector providing an image-bearing light;
wherein the waveguide combiner assembly is adapted to convey the respective image-bearing light from the input region to the output region of the waveguide substrate, to thereby output an image carried by the image-bearing light.

12. An augmented reality or virtual reality display, comprising:
two waveguide combiner assemblies, each comprising:
a waveguide combiner, having front and rear surfaces which are each substantially parallel to a waveguide plane, a direction normal to the waveguide plane being a waveguide axis, a distance between the front and rear surfaces along the waveguide axis being a thickness of the waveguide combiner;
a chassis including a support arm for supporting the waveguide combiner, the support arm defining a cavity between front and rear walls of the support arm which are spaced along a first direction by a distance greater than the thickness of the waveguide combiner, the waveguide axis and the first direction defining an offset angle between them which may be zero or non-zero, an edge portion of the waveguide combiner extending into the cavity;
at least one actively adjustable mounting structure configured to hold a respective point of the edge portion of the waveguide combiner at a selected position relative to the support arm, thereby enabling adjustment of the offset angle; and
at least one waveguide substrate having:
an input region able to couple a respective light of a given wavelength range into the at least one waveguide substrate; and
an output region able to couple the respective light of the given wavelength range out of the at least one waveguide substrate; and
two projectors, each associated with a respective waveguide combiner assembly, each affixed on the chassis and comprising an optical assembly configured to steer an image-bearing light towards the input region of the at least one waveguide substrate of the associated waveguide combiner assembly, each projector providing a respective image-bearing light;
wherein each waveguide combiner assembly is adapted to convey the respective image-bearing light from the input region to the output region of the at least one waveguide substrate, to thereby output an image carried by the respective image-bearing light; and
wherein each waveguide combiner assembly is adjusted such that the respective offset angles of the waveguide combiners achieve binocular alignment.

13. The augmented reality or virtual reality display of claim 12, wherein the at least one actively adjustable mounting structure comprises:
a clip member, configured to fit onto an edge of the waveguide combiner within the cavity;
front and rear clip extensions, at the front and rear of the clip member respectively, which extend towards the front and rear walls of the support arm, respectively, and terminate in front and rear clip extension ends, respectively;
an elongate slot in one or both of the front and rear walls of the support arm, the elongate slot to receive one of the front and rear clip extension ends therein in order for one of the front and rear walls to hold said end, and being elongate in a second direction which is perpendicular to the first direction; and
at least one of:
a first adjustment mechanism configurable to control the position of the clip member relative to the front and rear clip extension ends, whereby the spacing between the respective point of the waveguide combiner and the front and rear walls of the support arm can be adjusted; or
a second adjustment mechanism configurable to control the position of at least one of the front and rear clip extension ends independently within the respective elongate slot along the second direction, whereby the angle of the front and rear surfaces of the waveguide combiner relative to the front and rear walls of the support arm can be adjusted.

14. The augmented reality or virtual reality display of claim 13, wherein the first adjustment mechanism comprises a first threaded shaft forming the front and rear clip extensions, the first threaded shaft passing through a corresponding threaded aperture in the clip member, at least one end of the first threaded shaft being exposed through the respective elongate slot and having coupling means to enable rotation of the first threaded shaft by a user, rotation of the first threaded shaft causing the clip member to move along the first threaded shaft.

15. The augmented reality or virtual reality display of claim 13, wherein the second adjustment mechanism comprises a channel in one or both of the front and rear walls of the support arm, the channel extending in the second direction and passing through the respective elongate slot, the channel containing a biasing element and a stopper element respectively located on opposite sides of the respective clip extension, wherein the stopper element is movable along the channel in the second direction and the biasing element biases the respective clip extension towards the stopper element.

16. The augmented reality or virtual reality display of claim 13, wherein:
the first adjustment mechanism can adjust a first component of the offset angle defined between the first direction and a projection of the waveguide axis on a first plane, the first plane being perpendicular to front and rear walls and containing the first direction; and
the second adjustment mechanism can adjust a second component of the offset angle defined between the second direction and a projection of the waveguide axis on a second plane, the second plane being perpendicular to the first plane and containing the first and second directions.

17. The augmented reality or virtual reality display of claim 13, wherein the first and second adjustment mechanisms are adapted to adjust a yaw and a pitch of the waveguide combiner in a reference frame of the chassis, respectively, or vice versa.

18. A method for adjusting two waveguide combiner assemblies, comprising:
providing a first waveguide combiner assembly and a second waveguide combiner assembly sharing a common chassis, each comprising a waveguide combiner having front and rear surfaces which are each substantially parallel to a waveguide plane, a direction normal to the waveguide plane being a waveguide axis, a distance between the front and rear surfaces along the waveguide axis being a thickness of the waveguide combiner;
the common chassis including a support arm for supporting the waveguide combiners, the support arm defining a cavity between front and rear walls of the support arm which are spaced along a first direction by a distance greater than the thickness of the waveguide combiner, the waveguide axis and the first direction defining an offset angle between them which may be zero or non-zero, an edge portion of each waveguide combiner extending into the cavity; and
each of the first waveguide combiner assembly and second waveguide combiner assembly further comprising at least one actively adjustable mounting structure configured to hold a respective point of the edge portion of the waveguide combiner at a selected position relative to the support arm, thereby enabling adjustment of the offset angle;
providing a first projector and a second projector affixed on the common chassis;
providing an image-treatment device, a first optical sensor and a second optical sensor, the first and second optical sensors being connected to the image-treatment device;
actuating the first projector and the second projector to emit a first image-bearing light and a second image-bearing light, respectively, the first and second image-bearing lights embedding a first image and a second image, respectively, such that the first image-bearing light and the second image-bearing light are coupled into the first and second waveguide combiners, respectively, and out from the first and second waveguide combiners towards the first optical sensor and second optical sensor, respectively, whereby the first and second images are received by the first and second optical sensors, respectively; and
adjusting the at least one actively adjustable mounting structure of at least one of the first or second waveguide combiner assemblies such that the image-treatment device perceives the first and second images as positioned relative to one another on a same plane.

19. The method for adjusting two waveguide combiner assemblies according to claim 18, wherein the adjusting of the at least one actively adjustable mounting structure achieves at least partial binocular alignment, such that the image-treatment device perceives the first and second images as at least partially overlapping one another.

20. The method for adjusting two waveguide combiner assemblies according to claim 19, wherein at least a first part of the first image and at least a first part of the second image each comprise common virtual graphic information, and the adjusting of the at least one actively adjustable mounting structure is such that the image-treatment device perceives the first and second images to be positioned such that the first part of the first image and the first part of the second image overlap and are aligned with one another.

* * * * *

UNITED STATES PATENT AND TRADEMARK OFFICE
CERTIFICATE OF CORRECTION

| | | |
|---|---|---|
| PATENT NO. | : 12,248,155 B2 | Page 1 of 1 |
| APPLICATION NO. | : 18/729835 | |
| DATED | : March 11, 2025 | |
| INVENTOR(S) | : Stephen John Rogers | |

It is certified that error appears in the above-identified patent and that said Letters Patent is hereby corrected as shown below:

In the Claims

In Column 26, Line 63, in Claim 2, delete "and/or" and insert --or-- therefor

In Column 28, Line 3, in Claim 10, before "at", delete "or each"

Signed and Sealed this
Twenty-eighth Day of October, 2025

John A. Squires
*Director of the United States Patent and Trademark Office*